Jan. 7, 1958 G. E. STILWELL 2,818,569
MACHINE FOR APPLYING METAL STRAPS TO BOXES, CRATES AND CASES
Filed March 25, 1955 20 Sheets-Sheet 1
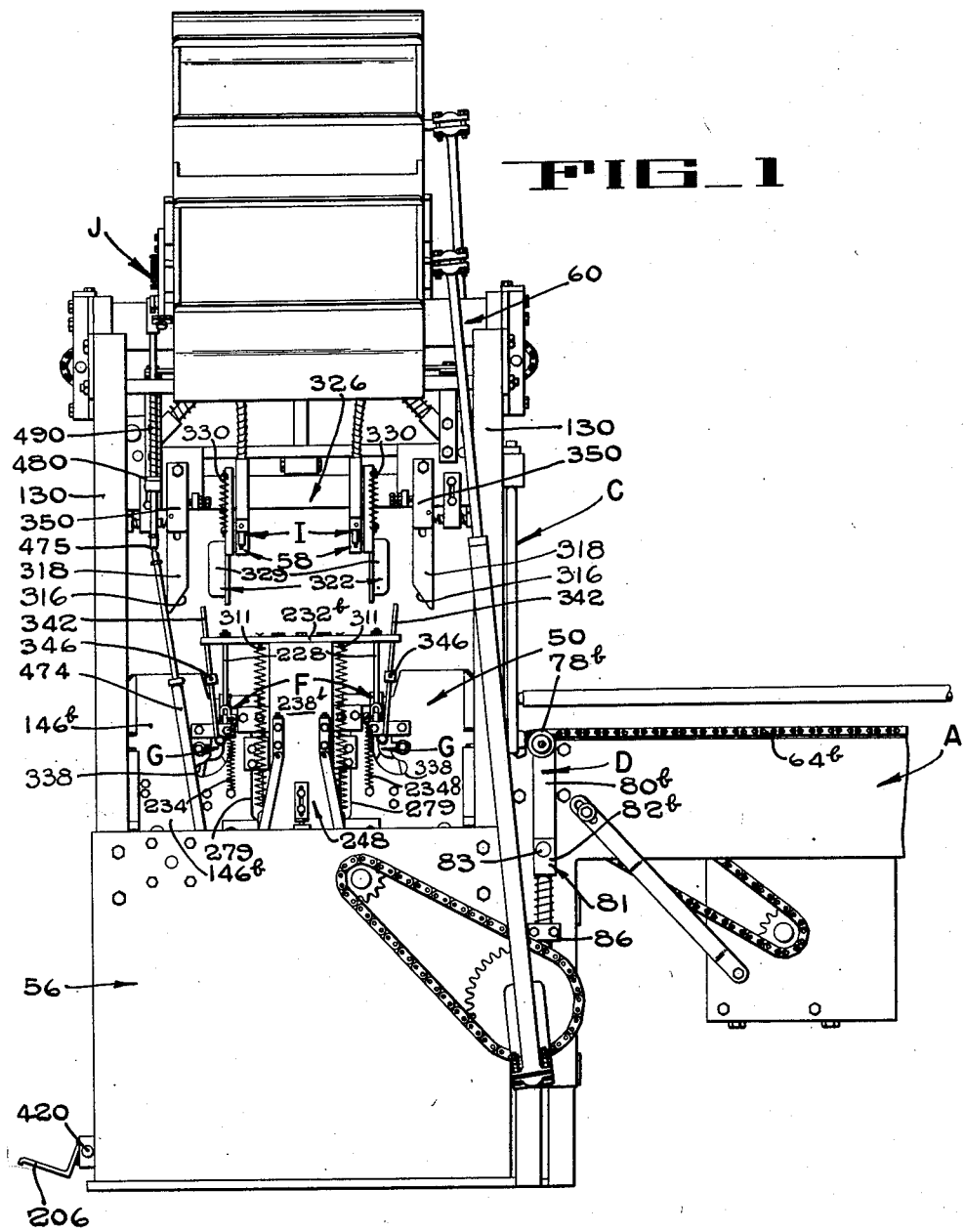
INVENTOR
GLENN E. STILWELL
BY Hans G. Hoffmeister
ATTORNEY

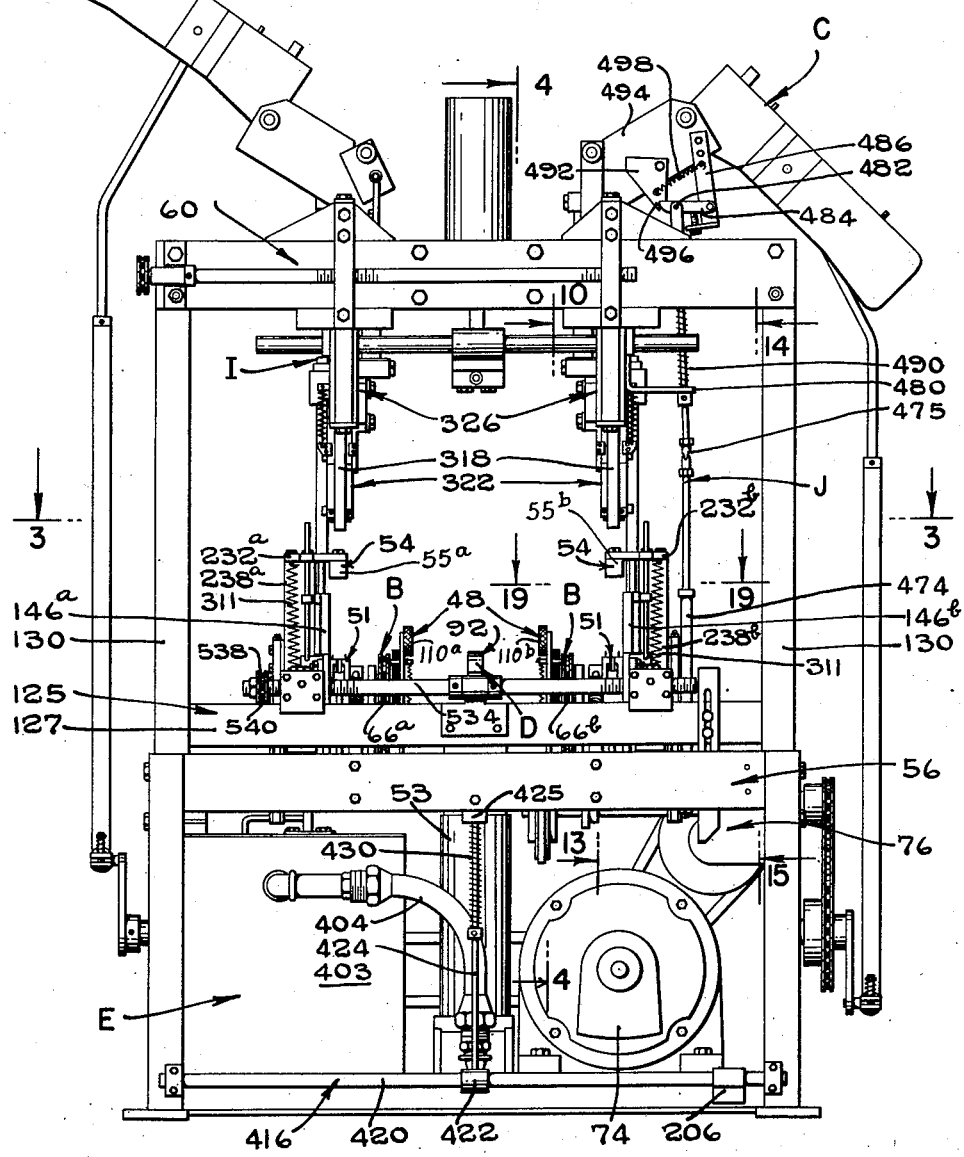

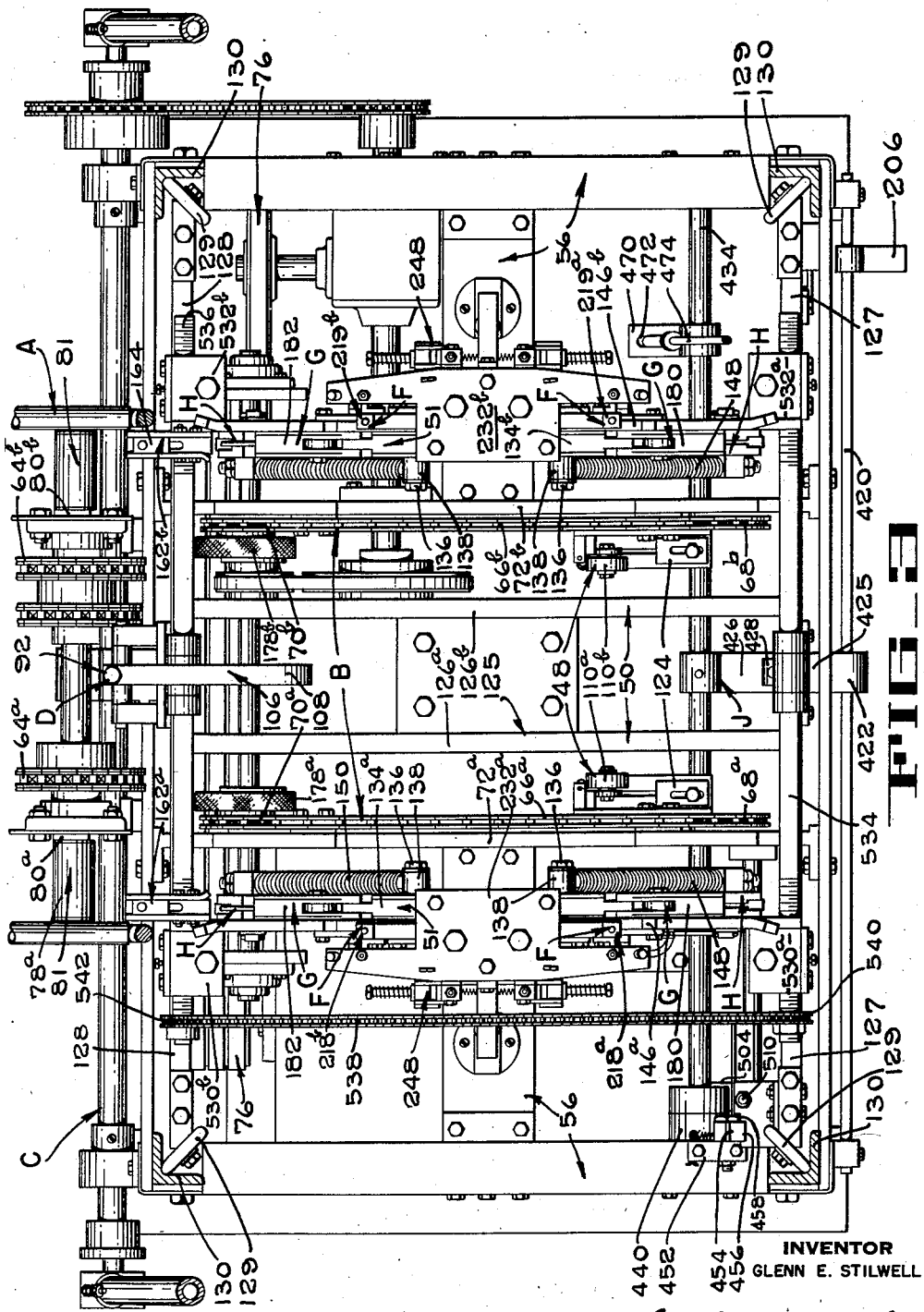

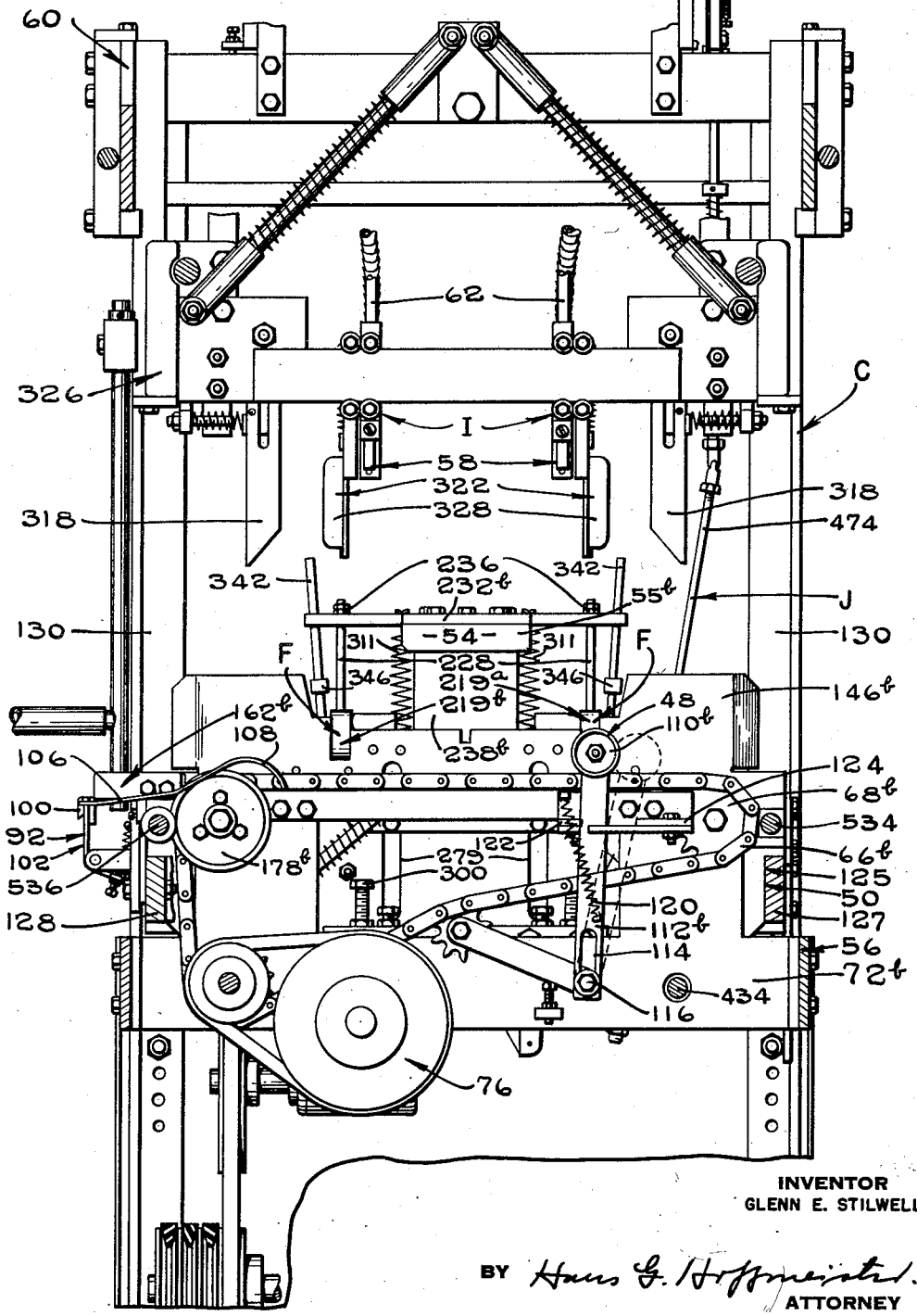

Jan. 7, 1958          G. E. STILWELL          2,818,569
MACHINE FOR APPLYING METAL STRAPS TO BOXES, CRATES AND CASES
Filed March 25, 1955                 20 Sheets-Sheet 5
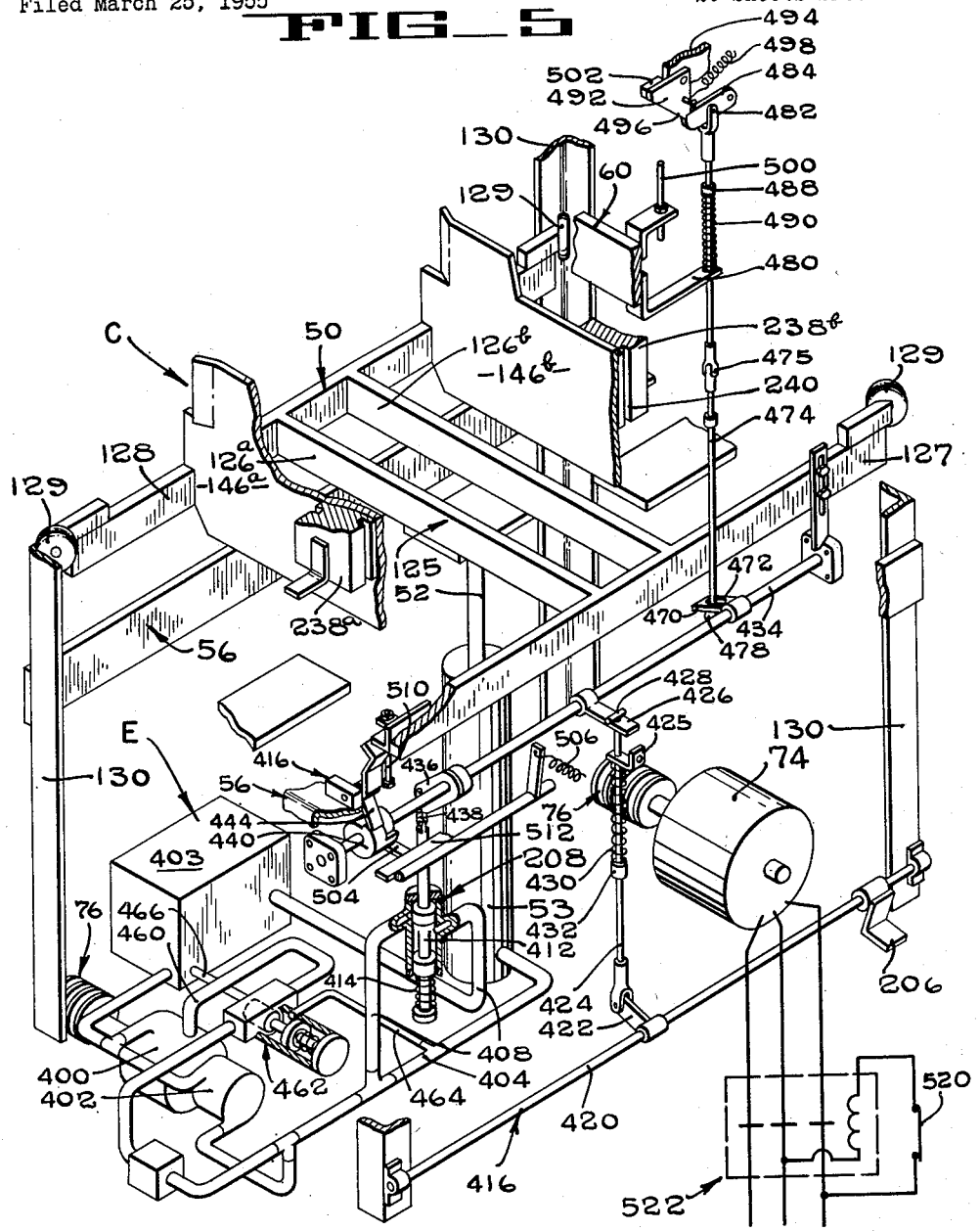
FIG_5
INVENTOR
GLENN E. STILWELL
BY *Hans G. Hoffmeister*
ATTORNEY

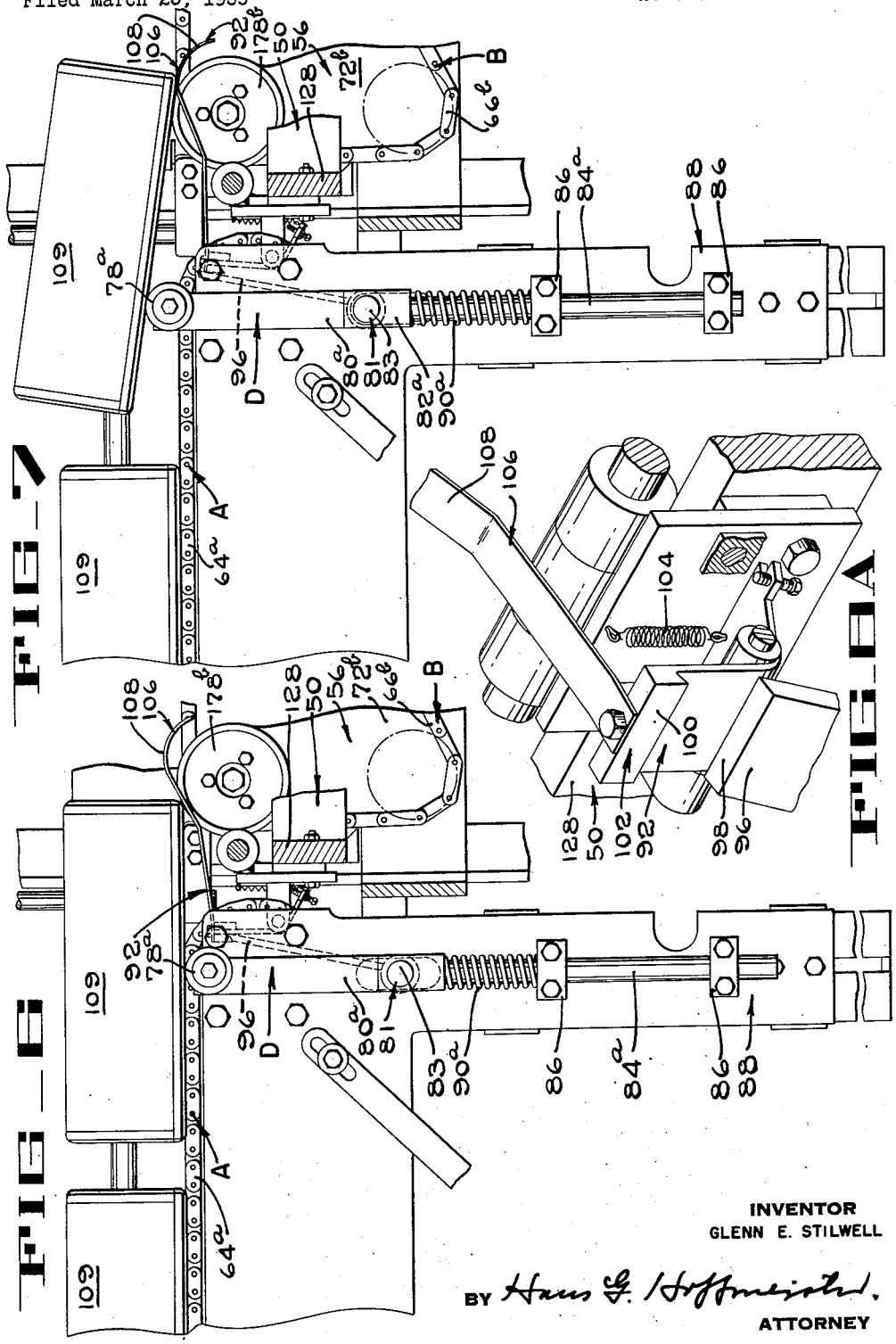

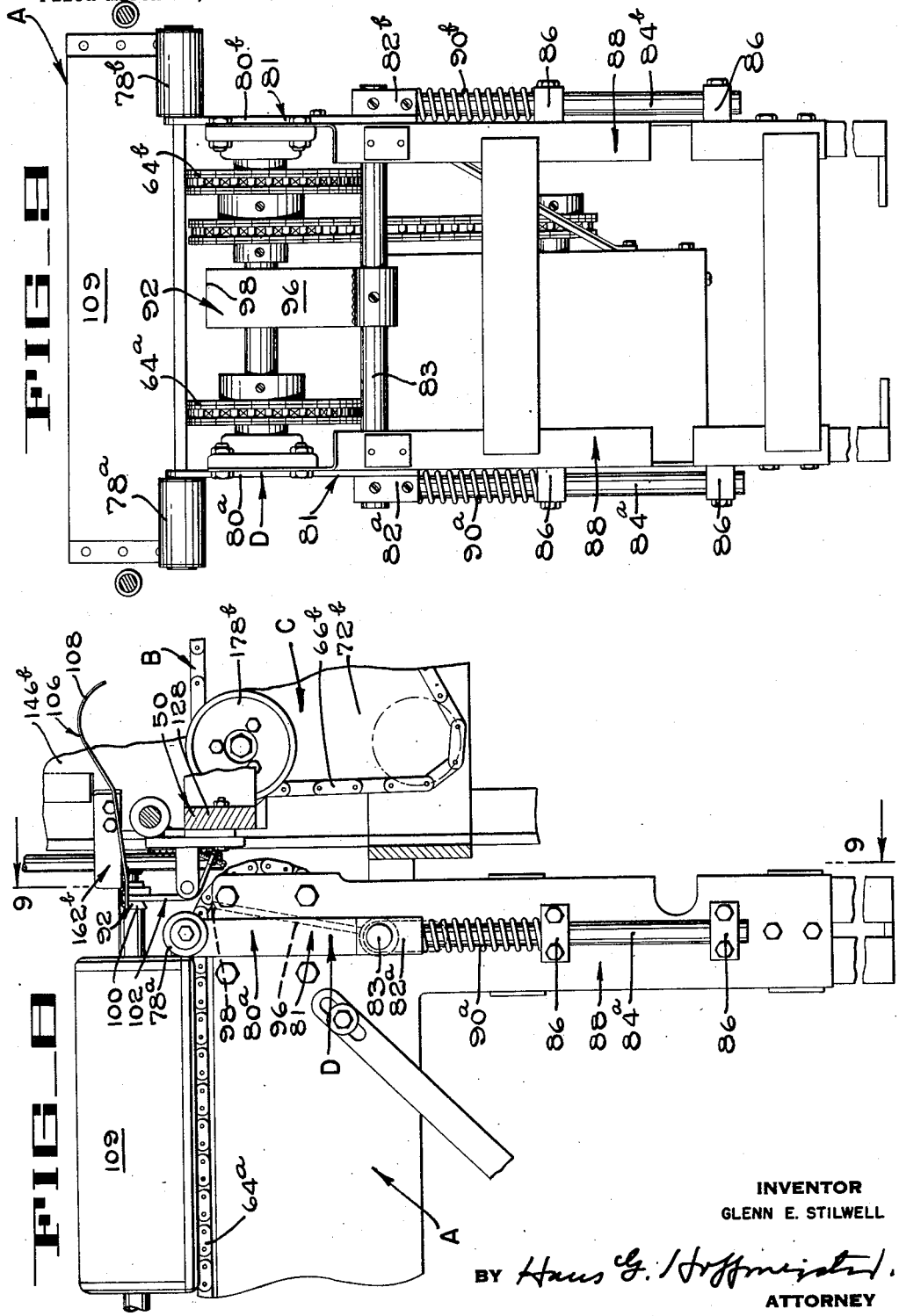

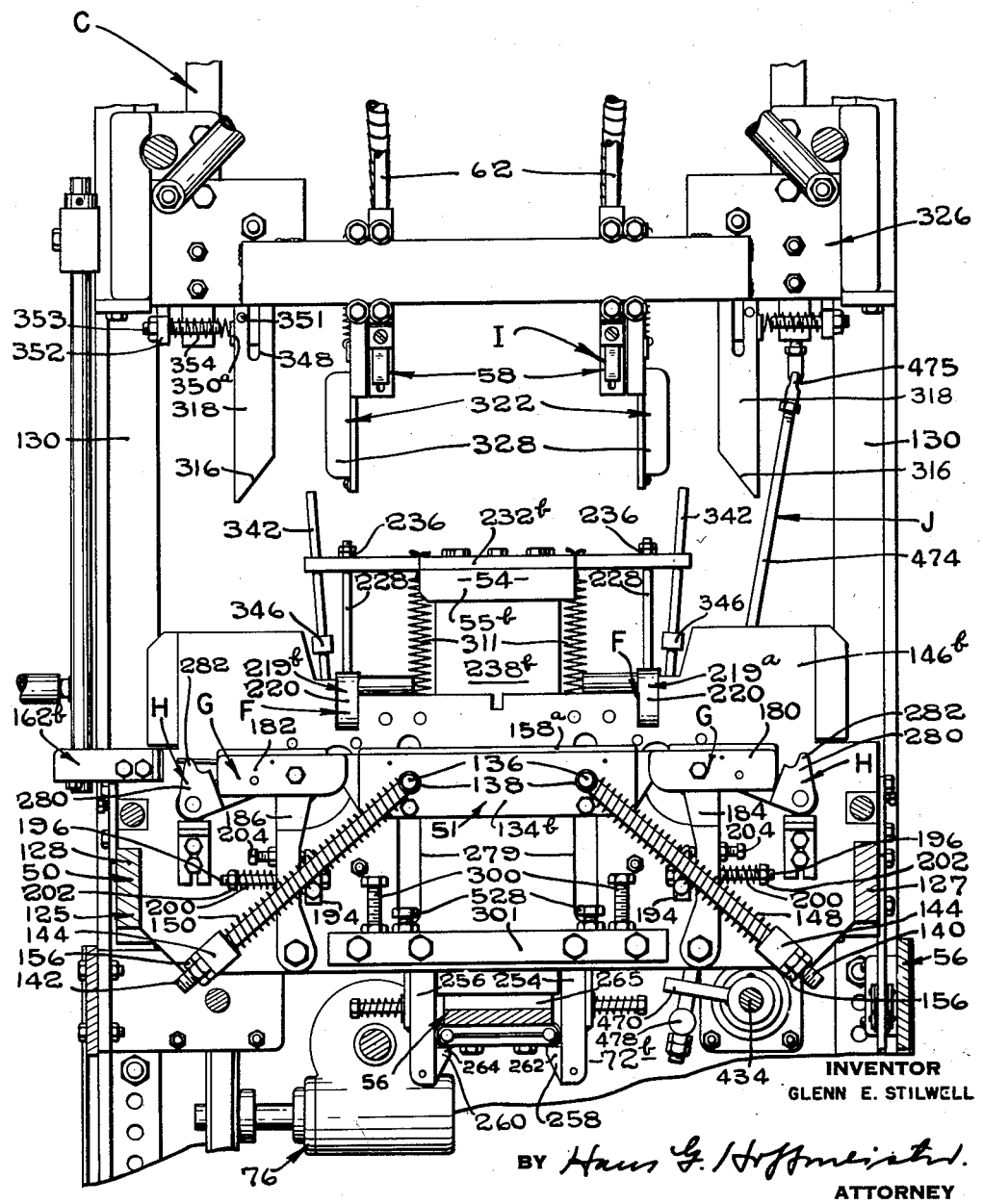

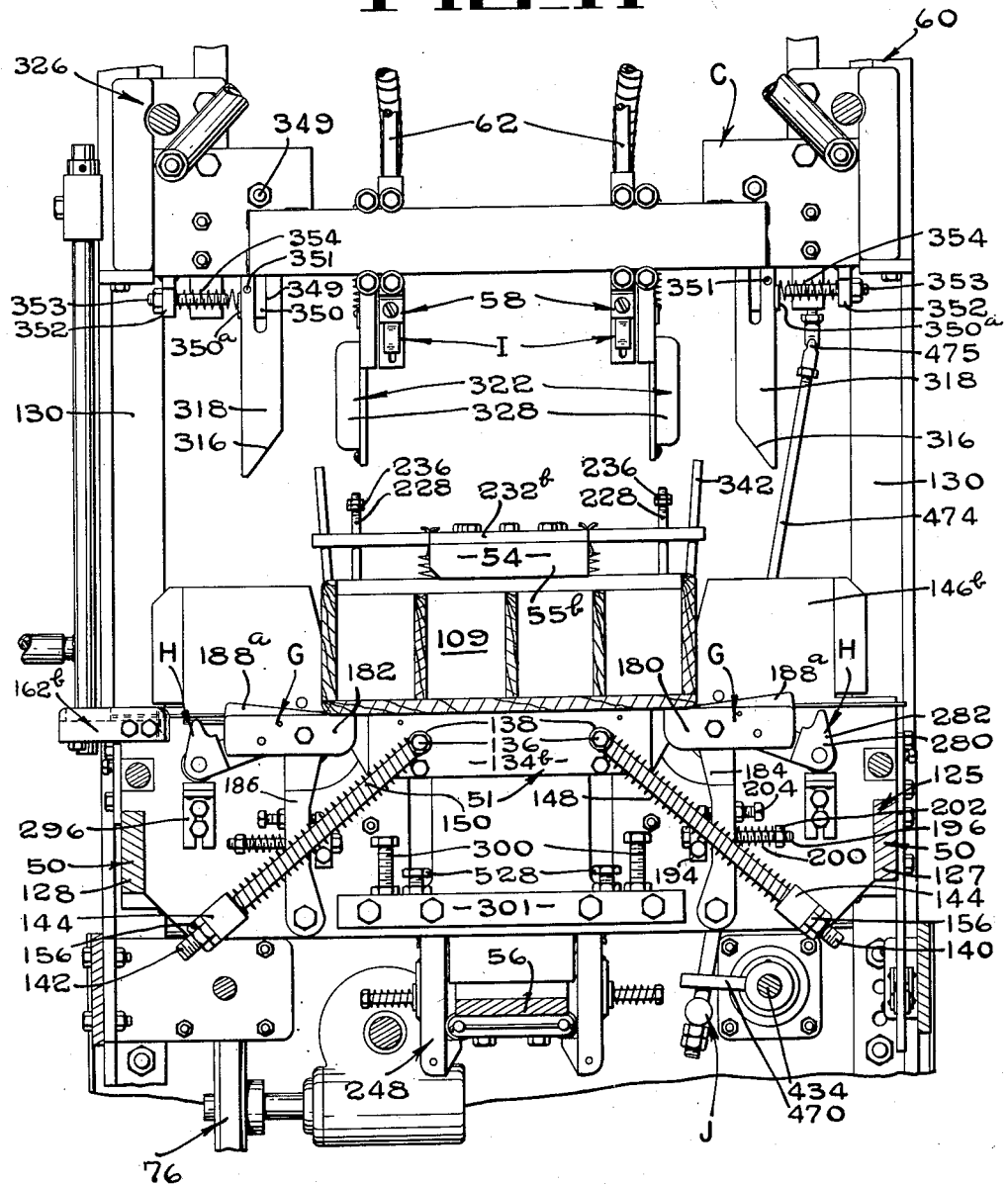

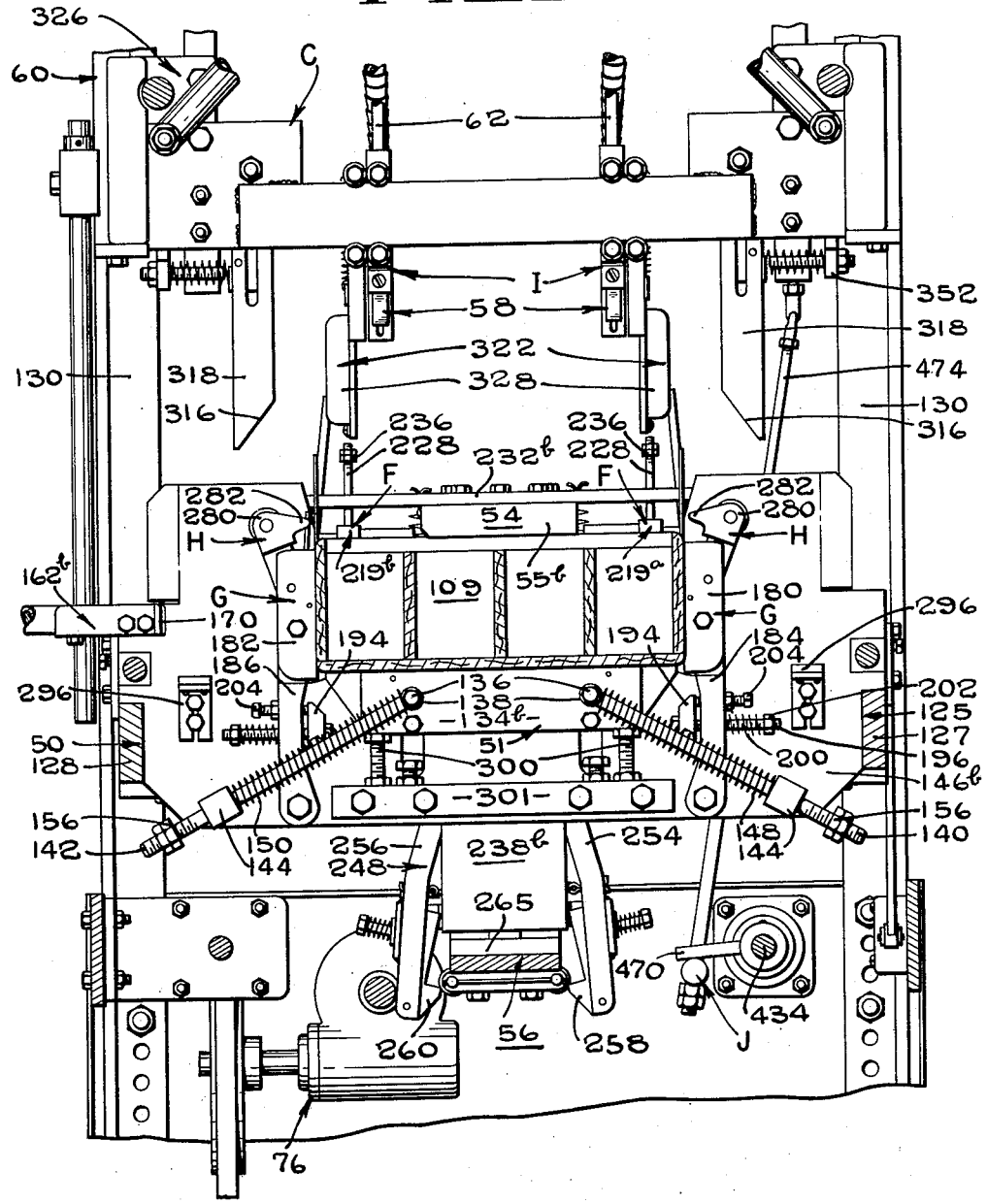

Jan. 7, 1958          G. E. STILWELL          2,818,569
MACHINE FOR APPLYING METAL STRAPS TO BOXES, CRATES AND CASES
Filed March 25, 1955          20 Sheets-Sheet 11
FIG_13
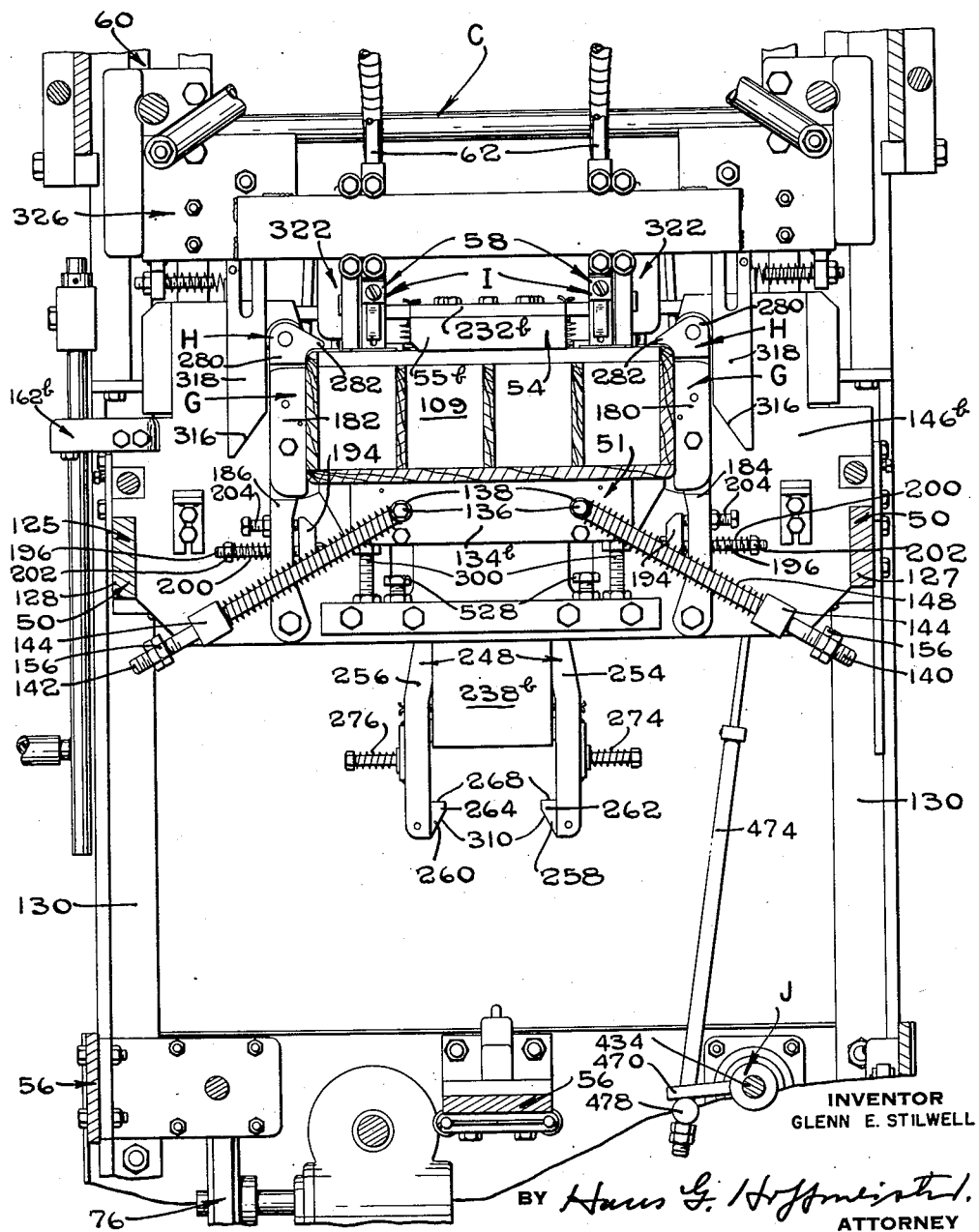
INVENTOR
GLENN E. STILWELL
BY *Hans G. Hoffmeister*
ATTORNEY

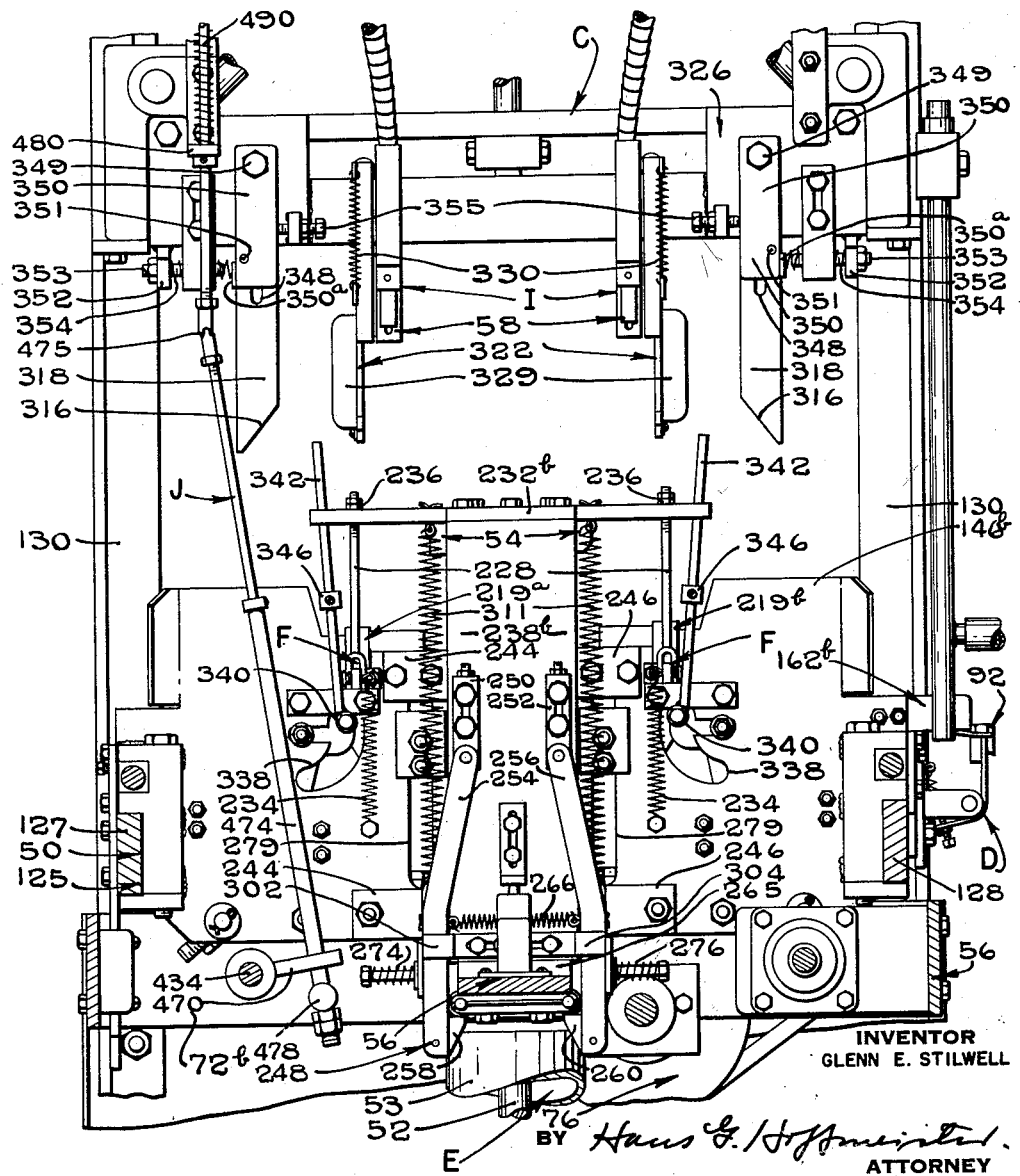
FIG_14

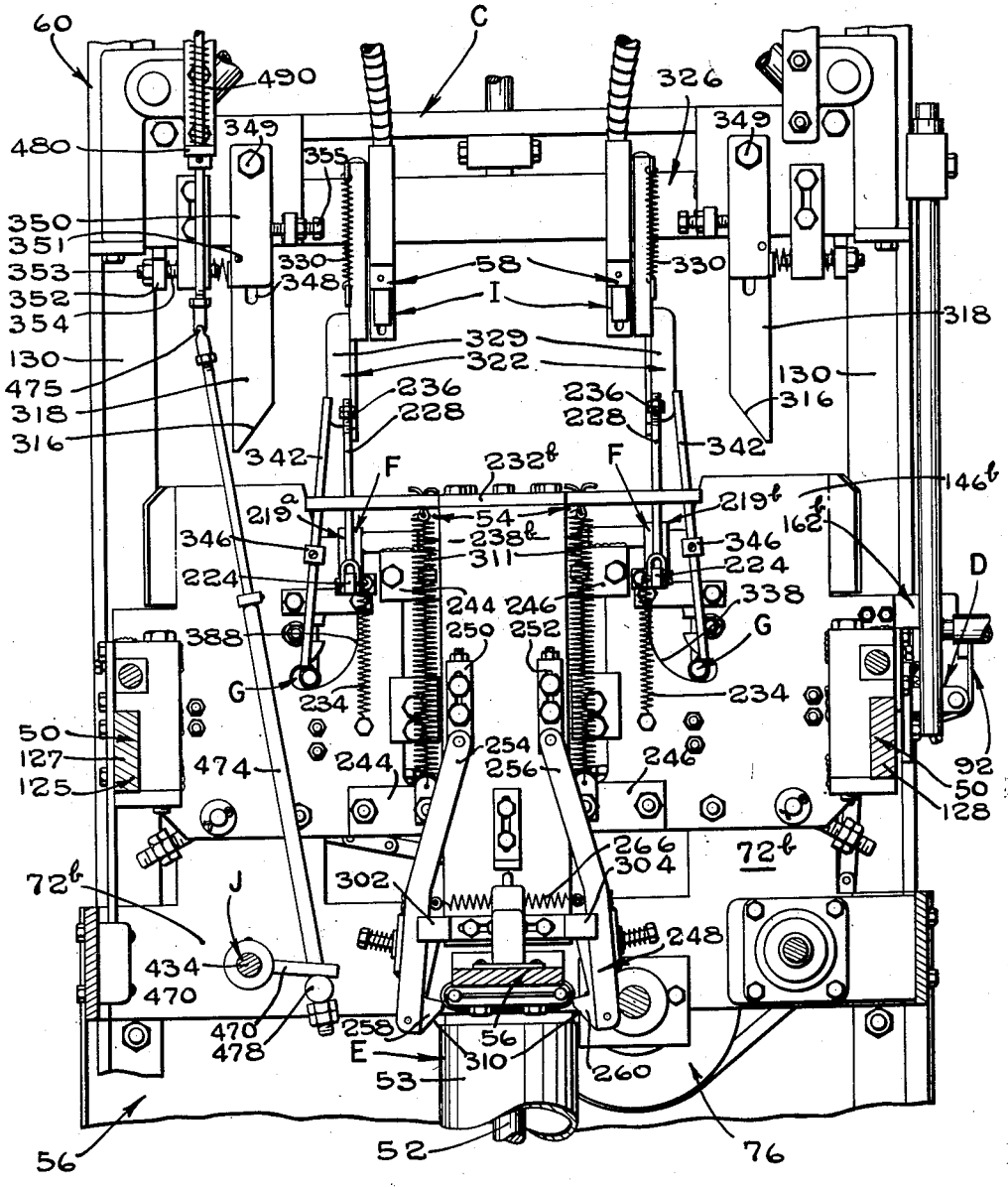

Jan. 7, 1958 G. E. STILWELL 2,818,569
MACHINE FOR APPLYING METAL STRAPS TO BOXES, CRATES AND CASES
Filed March 25, 1955 20 Sheets-Sheet 14
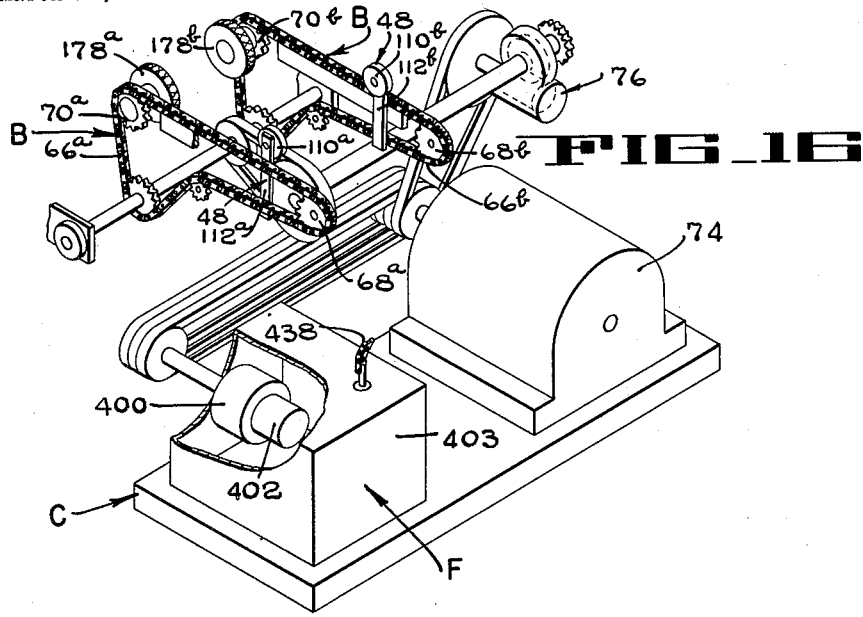
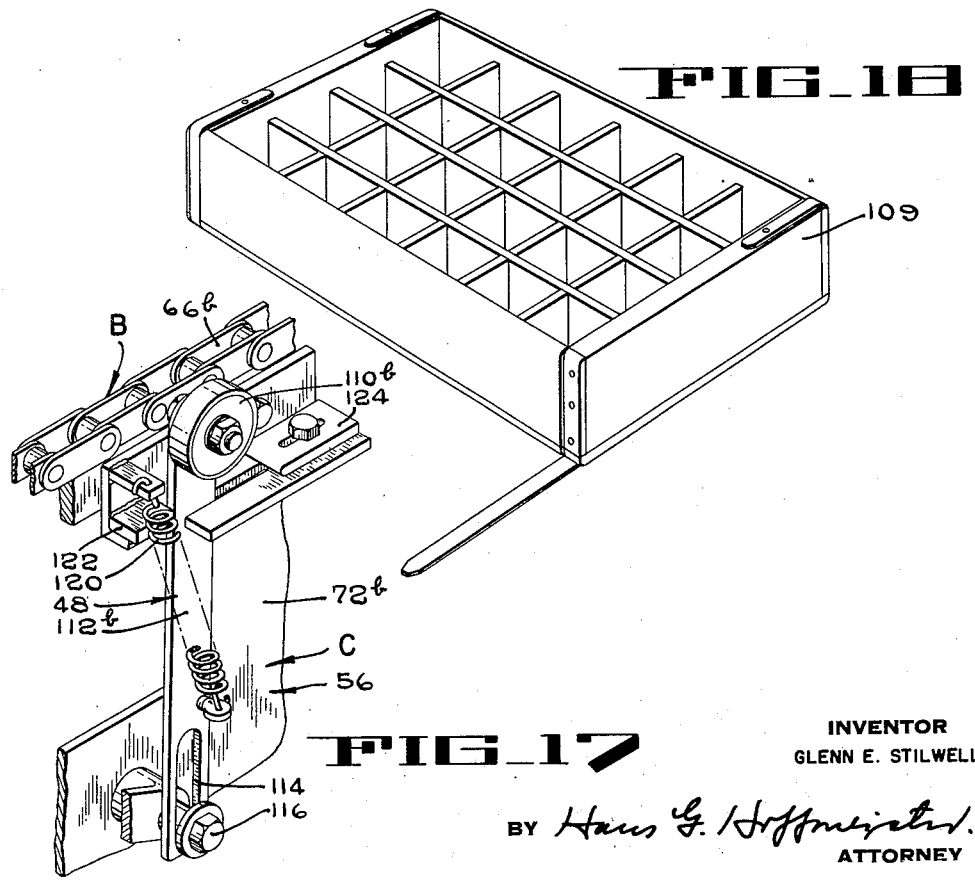
INVENTOR
GLENN E. STILWELL
BY Hans G. Hoffmeister.
ATTORNEY

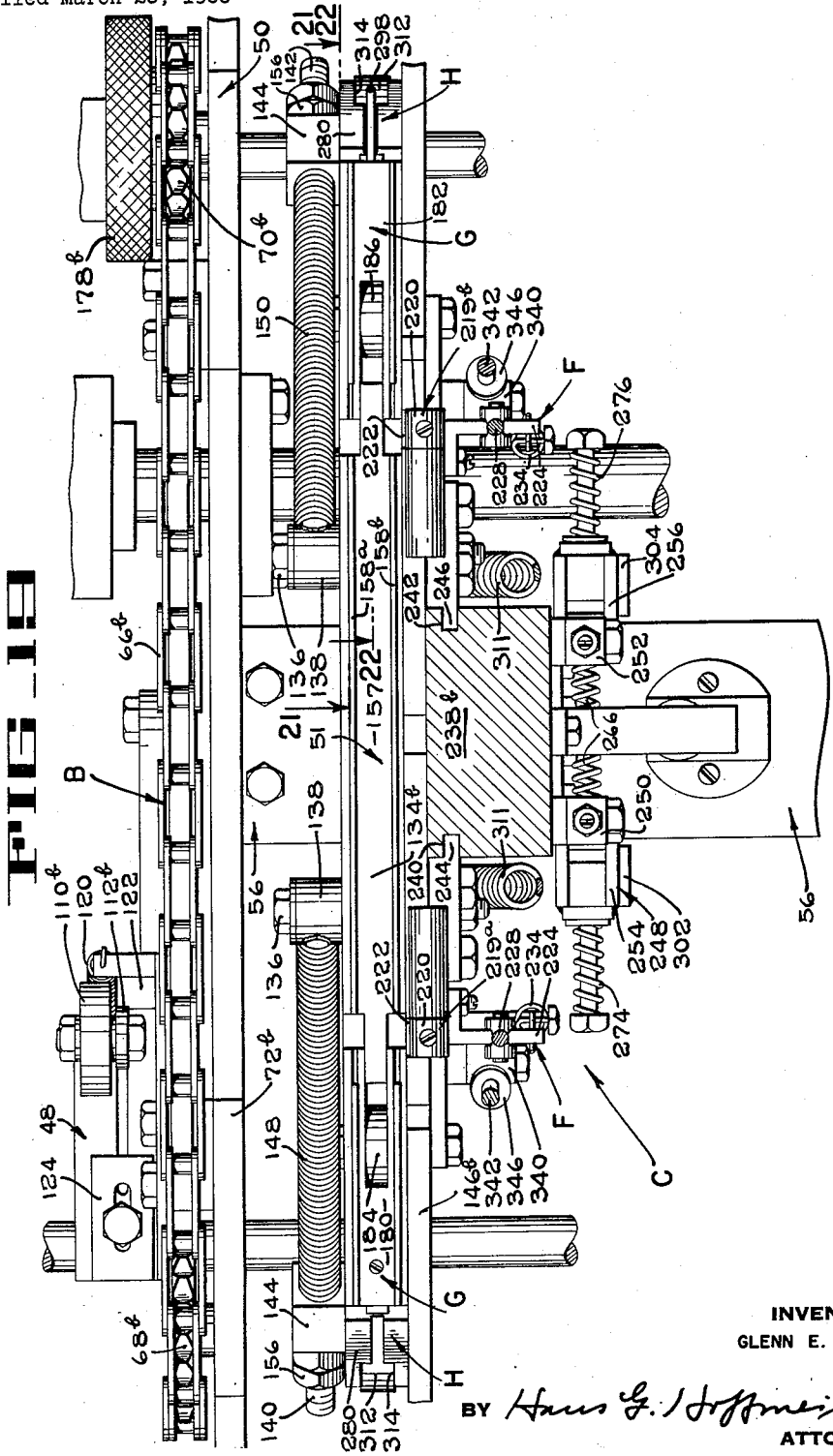
Jan. 7, 1958 — G. E. STILWELL — 2,818,569
MACHINE FOR APPLYING METAL STRAPS TO BOXES, CRATES AND CASES
Filed March 25, 1955 — 20 Sheets-Sheet 15
INVENTOR
GLENN E. STILWELL

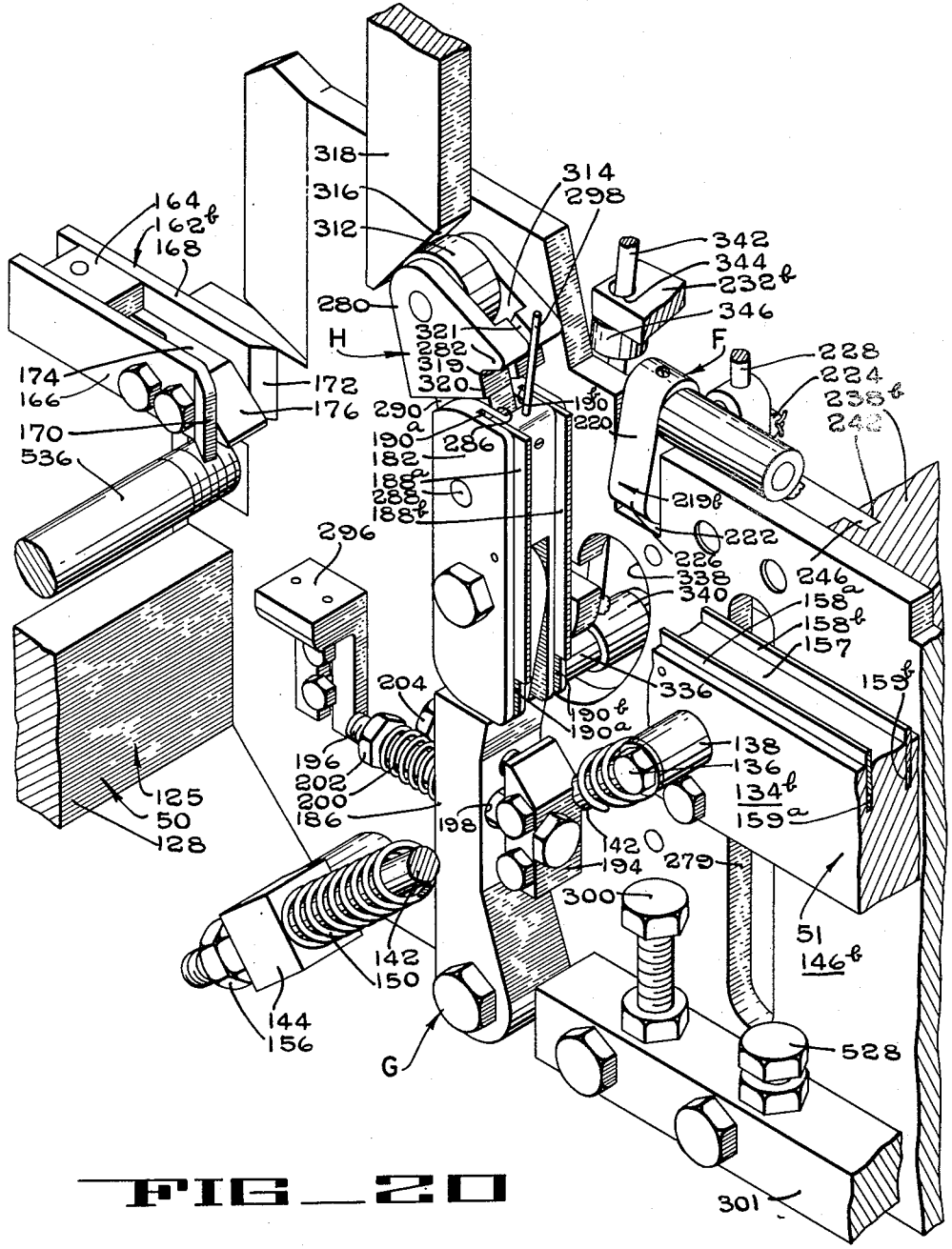

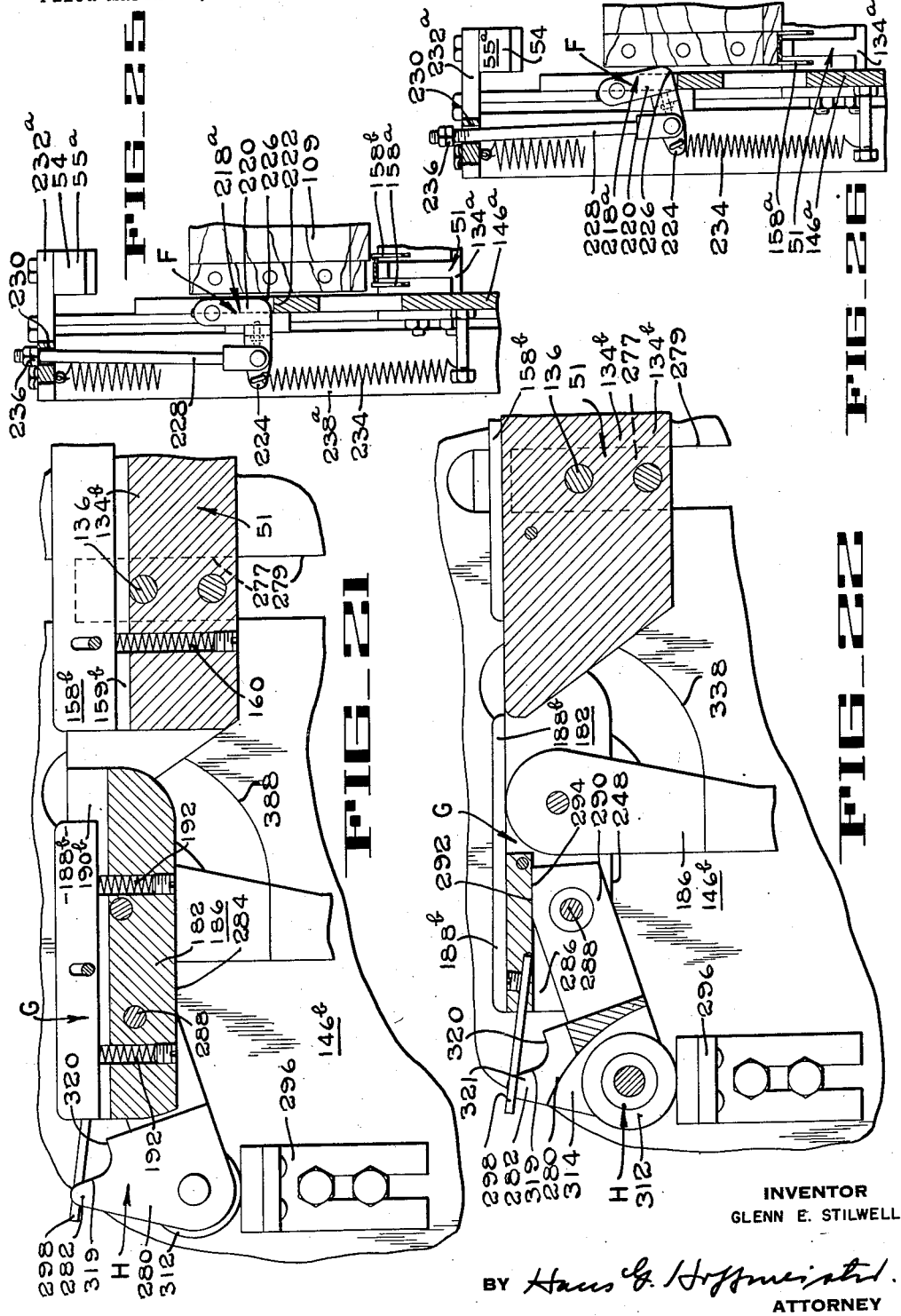

Jan. 7, 1958   G. E. STILWELL   2,818,569
MACHINE FOR APPLYING METAL STRAPS TO BOXES, CRATES AND CASES
Filed March 25, 1955   20 Sheets-Sheet 18
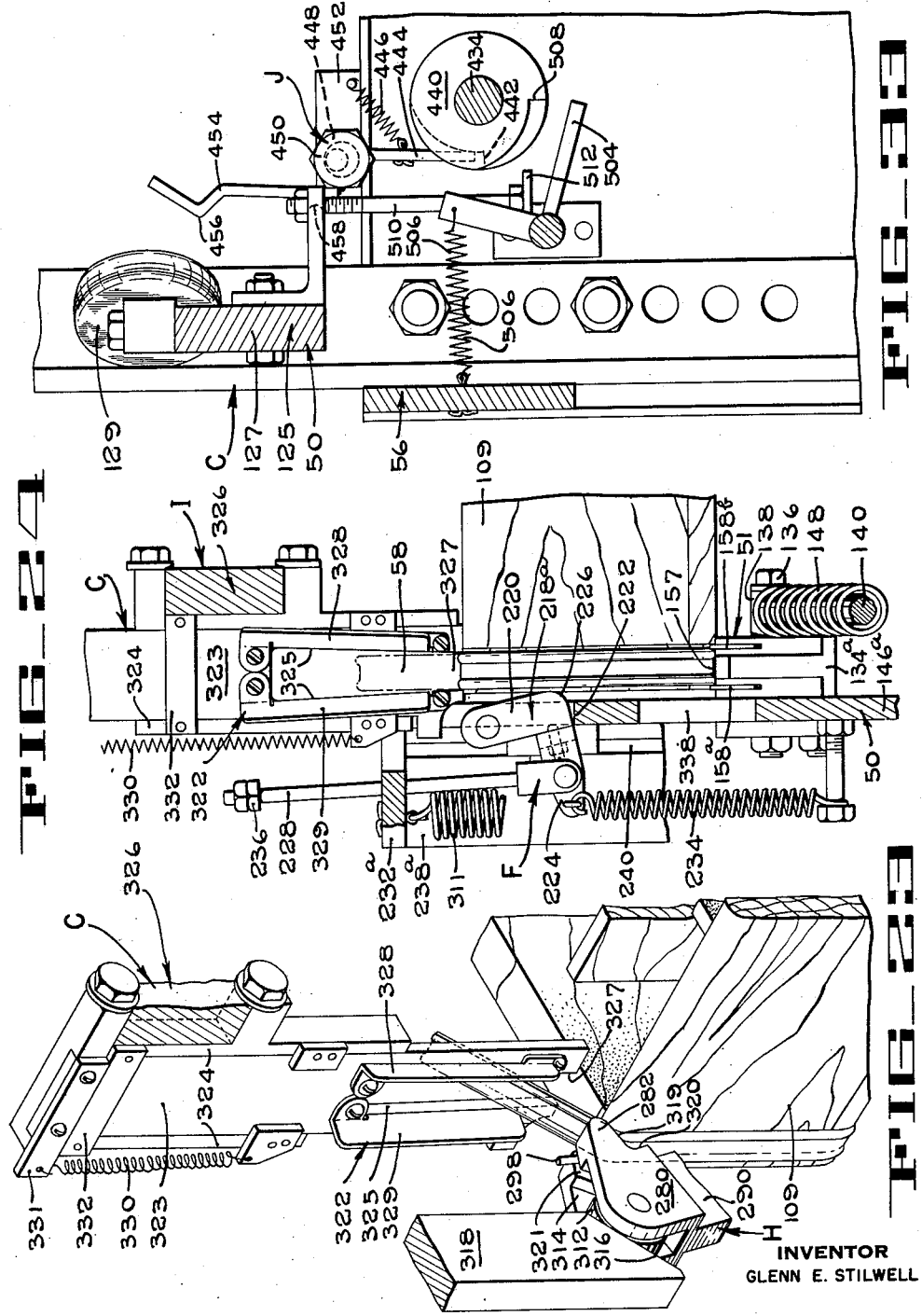
INVENTOR
GLENN E. STILWELL
BY *Hans G. Hoffmeister*
ATTORNEY Jan. 7, 1958 G. E. STILWELL 2,818,569
MACHINE FOR APPLYING METAL STRAPS TO BOXES, CRATES AND CASES
Filed March 25, 1955 20 Sheets-Sheet 19
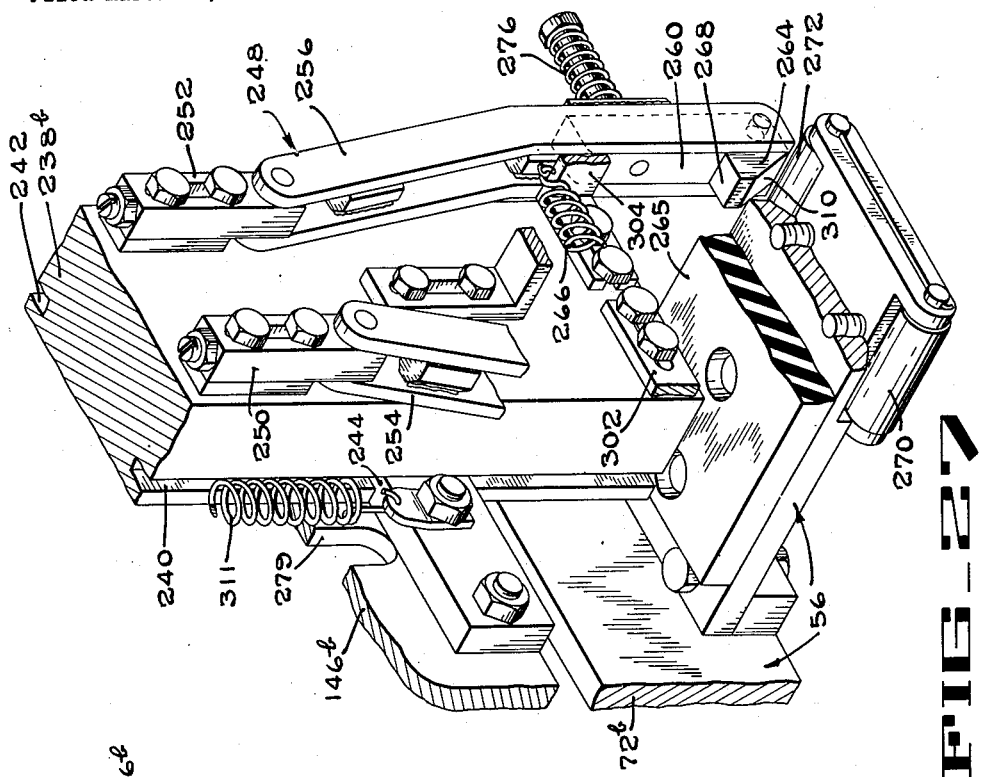
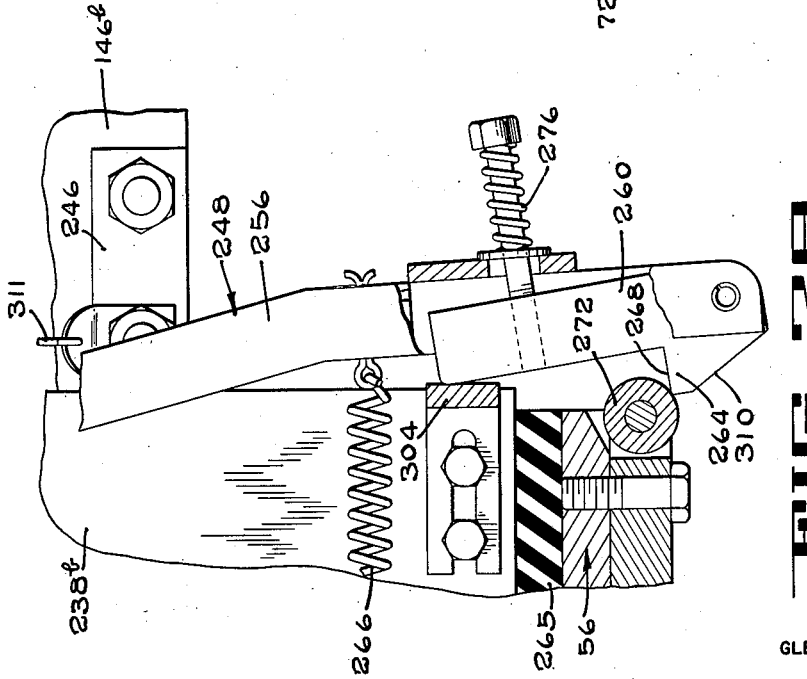
INVENTOR
GLENN E. STILWELL
BY Hans G. Hoffmeister
ATTORNEY Jan. 7, 1958  G. E. STILWELL  2,818,569
MACHINE FOR APPLYING METAL STRAPS TO BOXES, CRATES AND CASES
Filed March 25, 1955  20 Sheets-Sheet 20
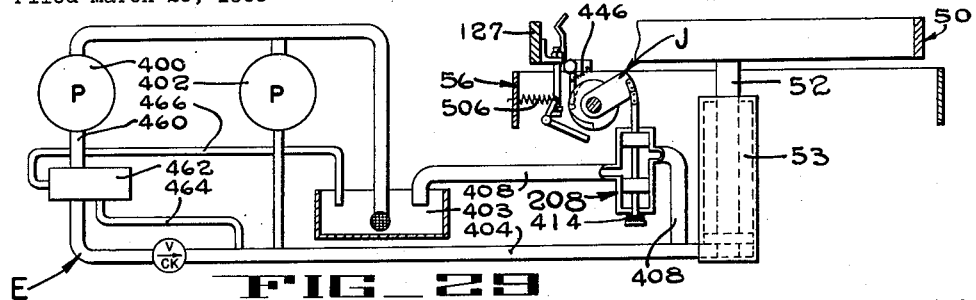
FIG_29
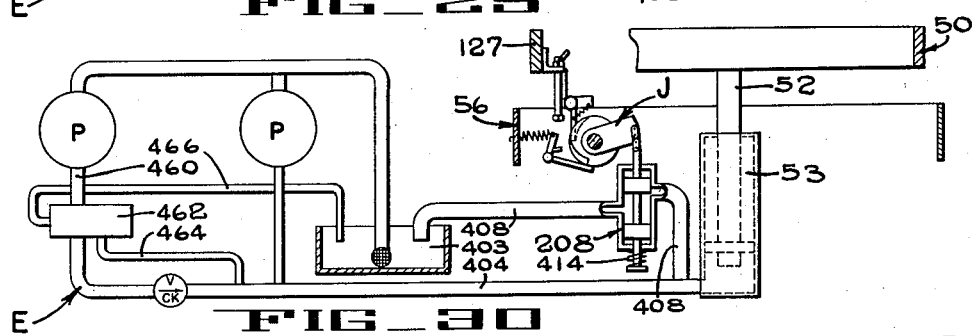
FIG_30
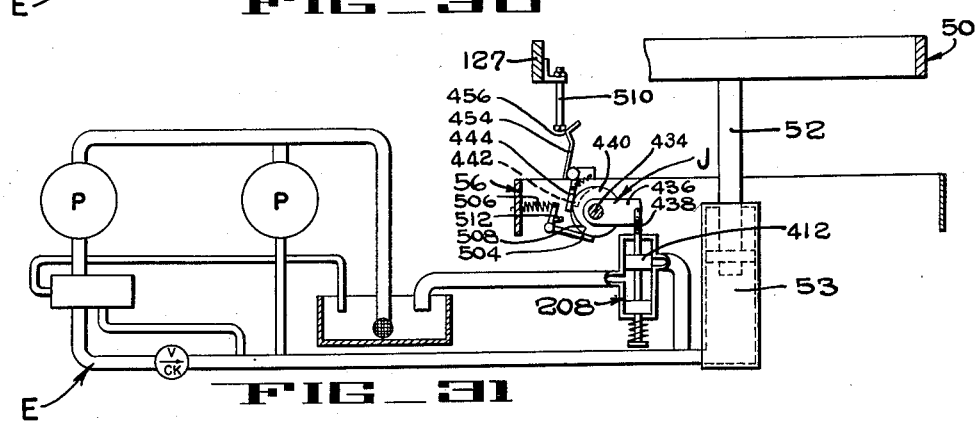
FIG_31
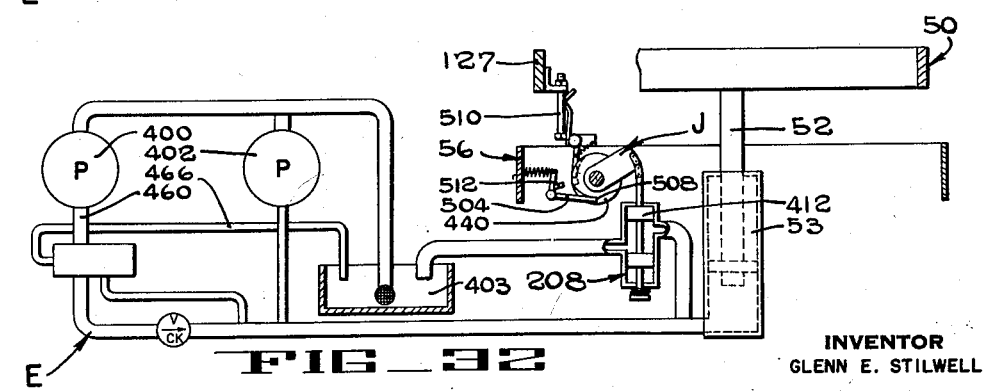
FIG_32
INVENTOR
GLENN E. STILWELL
BY Hans G. Hoffmeister
ATTORNEY United States Patent Office 2,818,569
Patented Jan. 7, 1958

2,818,569

MACHINE FOR APPLYING METAL STRAPS TO BOXES, CRATES, AND CASES

Glenn E. Stilwell, Riverside, Calif., assignor to Food Machinery and Chemical Corporation, San Jose, Calif., a corporation of Delaware Application March 25, 1955, Serial No. 496,676

30 Claims. (Cl. 1—10)

The present invention relates to nailing machines. More particularly the present invention relates to nailing machines that apply binding straps to boxes, crates or cases.

Beverage manufacturers customarily use wooden compartmented cases in which to store and transport their bottled product. The rough use to which such cases are put requires that they be replaced very frequently. In order to prolong the useful life of beverage cases of the type referred to, they are frequently bound with metal bands to assist in holding the side and bottom boards more tenaciously to the ends of the cases and thus increase their sturdiness.

It is an object of the present invention to provide a machine for accurately applying and securely fastening binding straps to cases of the type referred to.

Another object is to provide a machine of the type referred to that operates rapidly and requires a minimum of effort on the part of the attendant.

Another object is to provide a machine that operates to bend reinforcing metal straps around the end areas of a case, crate and the like, and which nails the bent straps securely into position.

Another object is to provide mechanism operative to facilitate entrance of a case into a machine of the type referred to means for porperly locating binding straps until the first case has been processed in, and is removed from, the machine.

Another object is to provide in machines of the type referred to, means for properly locating binding straps for subsequent application to the case.

Another object is to provide mechanism for properly positioning the cases in the machine for the subsequent strap applying and nailing operations.

Another object is to provide simple, efficient and smoothly operating mechanism for bending binding straps snugly about a case, crate or the like.

Another object is to provide a case strapping machine that is readily adjustable to handle cases of different sizes.

Another object is to provide a machine for bending reinforcing metal straps about, and nailing them onto, cases, crates and the like, that will incur no damage when accidentally operated without holding a case or crate.

These and other objects and advantages will become apparent from the following description of the accompanying drawings which illustrate a preferred embodiment of the invention and wherein:

Fig. 1 is a side elevation of a case strapping machine embodying the invention and of the case supply conveyor for said machine;

Fig. 2 is a front elevation of the machine;

Fig. 3 is a horizontal section through the machine taken along line 3—3 of Fig. 2;

Fig. 4 is a longitudinal vertical section through the machine taken along line 4—4 of Fig. 2, certain parts being broken away;

Fig. 5 is a partly diagrammatical, fragmentary perspective of the machine illustrating the hydraulic system forming part of the machine and the control mechanisms therefor;

Figs. 6, 7 and 8 are fragmentary side elevations of the supply conveyor with part of the machine shown in section, and illustrate a sequence of different operational positions of a case supply control mechanism;

Fig. 8A is a perspective view of a portion of Fig. 8;

Fig. 9 is an end elevation of the case supply conveyor viewed in the direction of arrows 9—9 of Fig. 8;

Figs. 10, 11, 12 and 13 are fragmentary, longitudinal, vertical sections through the machine taken along lines 10—13 of Fig. 2 and illustrating a sequence of consecutive operational positions thereof;

Figs. 14 and 15 are fragmentary, longitudinal sections through the machine taken along lines 14—15 of Fig. 2 illustrating operational positions corresponding to those shown in Figs. 10 and 12, but viewed in the opposite direction;

Fig. 16 is a fragmentary perspective of a conveyor comprised in the machine of the invention and of the power train therefor;

Fig. 17 is a fragmentary perspective of a case positioning mechanism that is associated with the conveyor illustrated in Fig. 16;

Fig. 18 is a perspective of a case of the type for which the machine of the invention is designed;

Fig. 19 is an enlarged fragmentary, horizontal section through one side of the machine taken along line 19—19 of Fig. 2;

Fig. 20 is a fragmentary perspective of one of the strap bending mechanisms comprised in the machine;

Fig. 21 is a fragmentary, vertical section through part of the strap bending mechanism taken along line 21—21 of Fig. 19;

Fig. 22 is another fragmentary, vertical section through part of the strap bending mechanism, similar to Fig. 21, but taken along a plane parallel to, and spaced transversely from, the sectional plane of Fig. 21, as indicated by line 22—22 in Fig. 19;

Fig. 23 is a fragmentary perspective of part of the strap bending mechanism and associated components;

Fig. 24 is a fragmentary end elevation, partly in section, of components associated with the strap bending mechanisms;

Figs. 25 and 26 are fragmentary end elevations, partly in section, illustrating two different operational positions of a mechanism that is associated with the strap bending mechanism;

Fig. 27 is another fragmentary perspective of component mechanisms of the strap bending mechanism;

Fig. 28 is a vertical section through part of the mechanism shown in Fig. 27 illustrating a different operational position thereof;

Figs. 29 to 32 are diagrams illustrating a sequence of consecutive operational positions of the hydraulic system comprised in the machine of the invention;

Fig. 33 is a detail view illustrating a control mechanism of the hydraulic system shown in Figs. 5 and 29 to 32.

General construction of the machine

Having first reference to Fig. 1, the case handling equipment illustrated therein includes a supply conveyor A upon which the cases to be strapped are deposited and which delivers them in single file formation and in transverse position, i. e., with the ends to be strapped located at either side of the conveyor, onto a receiving conveyor B that extends through, and forms part of, the actual case strapping machine C. Interposed between the supply conveyor A and the receiving conveyor B is a supply control mechanism D that operates to prevent cases from entering the strapping machine C until a preceding case has been fully processed in the machine and is removed therefrom. Located near the leading end of the receiving conveyor B within the strapping machine C is a stop mechanism 48 that arrests further advance of a case on receiving conveyor B when it has reached its proper position longitudinally of the machine.

The actual strapping machine comprises a hydraulic table 50 upon which is yieldably mounted a case supporting anvil 51 (Fig. 2) upon whose opposite end portions the straps to be bent around the case may be placed in positions extending longitudinally of the machine. The hydraulic table is mounted upon the plunger 52 of a hydraulic cylinder 53 (Figs. 2 and 5) which is part of a hydraulic system E that operates to elevate or lower the hydraulic table during performance of the machine. Elevation of the hydraulic table 50 raises the anvil 51 and lifts the case above the receiving conveyor B until it encounters a retaining block 54 that is releasably anchored in the base structure 56 of the machine (Fig. 11). During this phase in the performance of the machine, means F enter into operation that align the case into proper position in a direction transversely of the machine (Figs. 25 and 26). The block 54 prevents temporarily further upward movement of the case upon the yieldable anvil 51, but the table 50 continues to rise and the resultant relative approach of table 50 and anvil 51 actuates mechanisms G at the four corners of the case which bend the opposite end portions of the straps about the leading and trailing side walls of the case (Fig. 12).

After table 50 and anvil 51 have approached each other to an extent sufficient to cause the strap bending mechanisms G to press the opposite end portions of the straps fully against the leading and trailing side walls of the case, continued upward movement of the table 50 is effective to release the retaining block 54 so that the anvil 51 with the case resting thereon rises in unison with the table 50. During this upward movement of the anvil 51 additional strap bending mechanisms H enter into operation which bend the upstanding end portions of the straps over the top edges of the end walls of the case (Figs. 13 and 23).

Continued upward movement of the table 50 brings the strapped top edges of the case end walls against the actual nailing mechanism I (Fig. 13) which comprises nail holding chucks 58 that are supported for upwardly yielding movement from the superstructure 60 of the machine, and as the chucks 58 are forced upwardly by continued upward movement of the table 50, stationary rods 62 slidably received within the chucks 58 are effective to drive the nails through the inwardly bent strap ends and into the end walls of the case.

When the hydraulic table 50 has reached its highest elevation and the nails have been driven fully into the end walls of the case, control mechanism J is actuated that reverses the movement of the hydraulic table 50 (Fig. 5). As the case upon anvil 51 approaches the level of the upper run of receiving conveyor B it descends upon and disables the initially mentioned box positioning stop mechanism 48; and as the table continues to descend and the anvil 51 reaches a level somewhat below the upper run of the continuously operating receiving conveyor B, and deposits the strapped case upon said conveyor with the case positioning stop mechanism 48 in disabled condition, the conveyor B becomes effective to eject the strapped case from the machine C onto a suitable platform or takeoff conveyor (not shown). As the table reaches its lowermost position, it causes the retaining block 54 to be re-anchored in the base structure of the machine enabling said block to effectively perform its task during the next cycle in the operation of the machine.

*The conveyors*

The supply conveyor A comprises a pair of endless sprocket chains 64a and 64b (Figs. 1 and 9) upon whose horizontal runs the cases to be strapped are delivered to the case strapping machine C. Similarly, the receiving conveyor B comprises a pair of endless sprocket chains 66a and 66b (Figs. 3, 4 and 16) that are trained around pairs of idler sprockets 68a, 68b and 70a, 70b pivotally supported at the supply and discharge ends, respectively, of the case strapping machine from side plates 72a and 72b of the base structure 56 of the machine. Said sprocket chains form horizontal runs that pass through the machine from the supply to the discharge end thereof and which may be positioned slightly below the level of the upper horizontal runs of the supply conveyor sprocket chains 64a and 64b. During performance of the machine the case supply conveyor A is maintained in a continuous state of operation from a suitable source of rotary power (not shown), and the receiving conveyor B is likewise maintained in a continuous state of operation by rotary power derived from an electric motor 74, situated within the base structure 56 of the machine, through a suitable train of pulleys, belts and worm gears that are collectively identified by the reference numeral 76 in Fig. 16.

*The case supply control mechanism*

In practical operation cases are deposited upon the supply conveyor A and pass from the leading end of said conveyor onto the trailing end of the receiving conveyor B and into the strapping machine C. To prevent cases deposited onto the supply conveyor from passing onto the receiving conveyor while a previously deposited case is processed in the machine, case supply control mechanism D is interposed between the two conveyors, as previously pointed out. Said supply control mechanism D comprises a pair of rollers 78a and 78b (Fig. 9) that are positioned at either side of the supply conveyor chains 64a and 64b and which are pivoted to the upper ends of vertically disposed bars 80a and 80b, respectively, that form part of a vertically movable slide carriage 81. The lower ends of said bars are firmly secured to blocks 82a and 82b, respectively, that are rigidly connected for movement in unison by a transverse rod 83 and which are mounted upon vertical rods 84a and 84b that slide in vertically spaced guide loops 86 which are supported from the frame structure 88 of the supply conveyor (Figs. 6, 7, 8 and 9). Springs 90a and 90b coiled around the rods 84a and 84b, respectively, and compressed between the blocks 82a, 82b and the upper guide loops 86 urge the rods 84a and 84b, and hence the rollers 78a and 78b, constantly in an upward direction into a position wherein the rollers 78a and 78b are located above the level of conveyor A (Fig. 8) and hence block passage of a case situated upon conveyor A onto conveyor B. Latching means 92 is provided, however, that maintains the rods 84a and 84b and hence the rollers 78a and 78b in a depressed position wherein said rollers are disposed below the level of supply conveyor A until a case passes from said conveyor onto the receiving conveyor B.

For this purpose an upwardly extending, forwardly inclined plate 96 is rigidly secured to the transverse rod 83 at a point intermediate the conveyor chains 64a and 64b (Figs. 8A and 9). Normally the upper edge 98 of said plate is engaged and held in depressed condition by a nose 100 provided at the upper end of a bell crank 102 that is rotatably supported from the hydraulic table 50 of the case strapping machine at the case supply end thereof, and which is yieldably urged into the position wherein its nose 100 engages the plate 96 by a spring 104. Secured to the upper end of the bell crank 102 is a release lever 106 (Figs. 6, 7, 8 and 8A) that extends in a direction forwardly of the conveyor advance and whose end forms an arch 108 that rises above the level of the receiving conveyor B at a point intermediate the chains of said conveyor B at the trailing end thereof, the distance between rollers 78a, 78b and said arch 108 in the direction of the conveyor advance being less than the width of the cases traveling in transverse position on the conveyors A and B.

As a case 109 (Fig. 6) passes from supply conveyor A onto the receiving conveyor B, it depresses the arched end 108 of release lever 106, forcing the bell crank 102 to swing in clockwise direction as viewed in Fig. 6 against the urgency of spring 104. As a result the latching nose 100 is withdrawn from the edge of plate 96, and the springs 90a and 90b raise the carriage 81 and thus elevate rollers 78a and 78b above the leading end of supply conveyor A. Due to the fact that the distance between the rollers 78a, 78b and the arched end 108 of release lever 106 in a direction longitudinally of the conveyor advance is less than the corresponding dimension of the case passing from supply conveyor A to receiving conveyor B, the rising rollers 78a and 78b will come against, and elevate the floor or bottom wall of the case passing thereover, and place the case into the oblique position illustrated in Fig. 7.

This has the advantage of accelerating the delivery of the case into the strapping machine, but the main advantage of the elevation of rollers 78a and 78b above the level of conveyor A before the case that initiates their elevation has passed over said rollers, lies in the fact that in this manner said rollers will dependably block advance of any succeeding case on supply conveyor A onto the strapping machine C, even if a case follows the latch-release-effecting case with its leading wall in contact with the trailing wall of the latch-release-effecting case.

After the rollers 78a and 78b have been raised into blocking position above the level of supply conveyor A, they remain in elevated, case-blocking position even after the case that operated the release lever, has passed on and has released the arched actuating end of said release lever, because elevation of rollers 78a and 78b under the urgency of springs 90a and 90b raises the edge 98 of plate 96 above the level of the latching nose 100 on bell crank 102 as best shown in Fig. 7. However, during operation of the case strapping machine the hydraulic table 50 rises above the level of the supply conveyor A, as will be explained hereinafter, and as said hydraulic table returns to its initial level at the end of a case strapping operation, and with the strapped case advanced beyond the position of the actuating arch 108 of release lever 106, the latching nose 100 on bell crank 102 comes down upon and engages the edge 98 of plate 96 (Fig. 8) and forces said plate and hence the rollers 78a and 78b downwardly into the position illustrated in Fig. 6 wherein said rollers are again depressed below the level of the case supply conveyor A, because with the strapped case removed from the arch 108 of release lever 106 the spring 104 returns the bell crank 102 to a position wherein its latching nose 100 is disposed vertically above the edge 98 of plate 96 as shown in Figs. 8 and 8A.

*The case positioning stop mechanism*

When a case has been passed from supply conveyor A onto receiving conveyor B and the described supply control mechanism D prevents any succeeding case from entering the strapping machine C, it is necessary that the case on the receiving conveyor B be properly located in a direction longitudinally of the machine with regard to the various components that cooperate in bending the straps about its end areas and nail them into position. The hereinbefore mentioned stop mechanism 48 is provided for this purpose. It includes yieldable stops mounted near the discharge end of the strapping machine in such manner that said stops are effective to arrest, without excessive shock, advance of the case on the continuously advancing receiving conveyor B in a position longitudinally of the machine wherein the implements of the case strapping machine may properly work on the case and wherein said case has cleared the actuating arch 108 of the release lever 106.

Having reference to Figs. 2, 4 and 17, rollers 110a and 110b are located in the path of a case advancing on the upper run of the receiving conveyor B, and to cushion the impact of a filled case against said rollers, these rollers are arranged to yield a limited distance in a direction forwardly of the conveyor advance. For this purpose the rollers 110a and 110b are pivoted to the upper ends of arms 112a and 112b, respectively, whose lower ends are provided with apertures 114 that are loosely engaged over studs 116 which project inwardly from the side plates 72a and 72b of the base structure 56 of the machine (Fig. 4). Springs 120 urge said arms 112a and 112b into substantially vertical positions determined by stop ledges 122 that are supported from the base structure of the machine and from which they may yield in a forward direction until they strike another set of stop ledges 124 that are likewise supported from the base structure of the machine. As may be seen from both Figs. 4 and 17 the apertures 114 in the lower ends of arms 112a and 112b are of elongated conformation and the springs 120 are arranged to hold the lower ends of said apertures yieldably against the studs 116. By this arrangement the arms 112a and 112b and hence the rollers 110a and 110b at their upper ends may yield downwardly below their normal level, whenever sufficient force is applied to them in a downward direction.

*The hydraulic table and the anvil*

The hydraulic table 50 within the case strapping machine C is formed by a frame 125 comprised of two adjacently positioned longitudinally extending bars 126a and 126b, to whose opposite ends are secured transverse bars 127 and 128 (Figs. 3 and 5) and said transverse bars 127 and 128 carry at their opposite ends diagonally positioned rollers 129 (Fig. 33) which bear against and run in four vertically disposed angle irons 130 that form the four corner posts of the case strapping machine. The table frame 125 is suitably mounted upon the plunger 52 of the previously mentioned hydraulic cylinder 53 that is located in the base structure of the machine (Figs. 2 and 5). Supported by the frame 125 at either side of receiving conveyor B for downwardly yielding movement relative to said frame are the two halves of hereinbefore mentioned anvil 51. Said anvil halves are of identically symmetrical construction and each comprises an elongated block 134a or 134b, respectively (Figs. 10–13, 19 and 20), having inwardly projecting studs 136 near its opposite ends over which are rotatably engaged bushings 138 that are formed at the upper ends of two rods 140 and 142, respectively, which slant downwardly away from each other in a fore and aft direction longitudinally of the conveyor advance. The lower ends of said rods are slidably received in guide blocks 144 that are pivoted to the adjacent one of two vertically positioned longitudinally extending mounting plates 146a or 146b, respectively, which are secured to and rise from the frame 125 of the hydraulic table at either side of conveyor B. Coiled around the rods 140 and 142 and compressed between the guide blocks 144 at their lower ends and the bushings 138 at their upper ends are springs 148 and 150 which hold the anvil blocks yieldably in an elevated position relative to the hydraulic table as illustrated in Fig. 10. Nuts 156 threadedly engaged over the lower ends of the rods 140 and 142 below the guide blocks 144 prevent disengagement of said rods from the guide blocks under the urgency of springs 148 and 150, respectively.

To facilitate the insertion of straps underneath a case resting upon the anvil blocks 134a and 134b, each of the anvil blocks may be provided with a longitudinal guide channel 157 formed along its top surface by a pair of transversely spaced parallel metal strips 158a and 158b that are received in suitable grooves 159a and 159b provided in said anvil blocks and which are yieldably urged into effective position by springs 160 (Figs. 20 and 21). To properly locate a strap that is slid underneath a case resting upon the anvil blocks, from a position in front of the machine, each mounting plate 146a and 146b carries at the feed end of the machine in longitudinal alignment with the guide channel 157 of its anvil block a short guide channel 162a or 162b, respectively (Fig. 20). Adjustably supported within each of said guide channels is a stop block 164, and at its open strap-receiving end the side walls 166 and 168 of each channel are preferably flared outwardly as shown at 170 and 172 and its bottom wall 174 is arranged to slope downwardly as shown at 176 to facilitate insertion of the end of a strap into said channel. Upon proper adjustment of the location of the stop blocks 164 in channels 162a and 162b an operator in front of the machine may properly locate the straps with regard to a case resting upon the anvil blocks in a direction longitudinally of the machine by bringing the far ends of the straps against the blocks 164.

In order that a case delivered from the supply conveyor A onto the receiving conveyor B may pass over the guide channels 162a and 162b in an unobstructed manner, knurled roller discs 178a and 178b are arranged adjacent, and may turn in unison with, the idler sprockets 70a and 70b at the feed end of the receiving conveyor B (Figs. 3 and 16). Said roller discs should be of such diameter that they maintain a case passing from the supply conveyor A onto the receiving conveyor B above the level of the upper run of the receiving conveyor chains until it has advanced beyond the strap positioning guide channels 162a and 162b.

*The mechanism for bending the straps upwardly against the sides of the case*

To bend a strap inserted underneath a case on anvil blocks 134a and 134b about the side walls of the case, each anvil block is arranged to be of a length, in a direction longitudinally of the conveyor advance, somewhat shorter than the width of the case. Hence, a case arriving on the receiving conveyor B and arrested by the initially described stop rollers 110a and 110b in proper position above the anvil blocks 134a and 134b projects with its leading and trailing side portions a limited distance beyond the opposite ends of the anvil blocks as shown in Fig. 11.

Pivotally supported adjacent the opposite ends of each anvil block are bending levers 180 and 182, respectively, that are of a length substantially equal to the height of the side walls of the case. Said bending levers are of symmetrically identical construction, and each is pivoted at an intermediate point thereof to the upper end of an arm 184 or 186, respectively, that rises from and is pivoted to the bottom edge of the adjacent mounting plate 146a or 146b, as the case may be. Said arms are of such length that the bending levers at their upper ends, when in the reclined position illustrated in Fig. 10, are flush with their respective anvil block 134a or 134b, and extend with their inner ends below the floor or bottom wall of a case on said anvil blocks. To facilitate insertion of a strap underneath a case on anvil blocks 134a and 134b, the operating faces of the bending levers 180 and 182 may be provided with guide strips 188a and 188b (Fig. 20) received in slots 190a and 190b, respectively, in a manner similar to the anvil blocks 134a and 134b, and to prevent interference of said guide strips 188a and 188b with the strap bending operation, springs 192 may be interposed between the bottom edges of said strips and the floor of said slots as shown in Fig. 21 to urge said strip into effective strap guiding position when the bending levers are in the ineffective position shown in Figs. 10 and 11, yet permit said guide strips to be depressed below the surfaces of said levers, whenever said surfaces are brought to bear upon the straps during the actual bending operation.

The support arms 184 and 186 for the bending levers are held in a substantially vertical position in such a manner that they may yield outwardly away from the ends of their respective anvil block when sufficient force is brought to bear upon the inner ends of the bending levers 180 and 182, respectively. For this purpose a block 194 secured to mounting plate 146a or 146b as the case may be adjacent the inner side face of each support arm carries a horizontally disposed threaded bolt 196 that extends loosely through a suitable aperture 198 in the adjacent arm, and coiled around the outwardly projecting end portion of said bolt 196 is a spring 200 that is compressed between a nut 202 engaged over the outer end of the bolt and the outer side face of the support arm. Said spring urges the arm in a direction toward the adjacent end of its respective anvil block to an extent determined by another bolt 204 that is threadedly received in, and extends through, the support arm above the bolt 196 and which bears with its inwardly projecting end against the upper portion of the hereinbefore mentioned block 194.

When a case has been properly located above the anvil blocks 134a and 134b by the stop rollers 110a and 110b, and reinforcing straps have been slid underneath said case near its opposite ends, the attendant depresses a pedal 206 (Figs. 2 and 5) at the front end of the machine which causes adjustment of a control valve 208 in the hydraulic system E of the machine in a manner to be described hereinafter to a position wherein fluid is forced into the hydraulic cylinder 53. As a result thereof the table 50 begins to rise and raises the anvil blocks 134a and 134b and the case resting thereon.

*The case centering mechanism*

As the case is raised in the described manner, means enter into operation that align the case properly in a direction transversely of the machine so that the straps may be applied to precisely the end areas of the case with their ends overlying the top edge of the end walls thereof. For this purpose pairs of arms 218a, 219a and 218b, 219b of L-shaped conformation are pivotally supported adjacent the upper edges of the mounting plates 146a and 146b, respectively, of the hydraulic table 50 (Figs. 10 and 14). The arms 218a, 219a and 218b, 219b comprise vertical bars 220 located in suitable recesses 222 provided in said plates above the opposite ends of anvil blocks 134a and 134b, respectively and horizontal bars 224 projecting from said plates in a direction outwardly of the machine as shown in Fig. 25.

When the hydraulic table 50 is in its lowermost position, said arms are held in a condition wherein their vertical bars 220 are flush with the inner faces of the mounting plates 146a and 146b, respectively, and do not project into the space defined by and between said plates, but as the hydraulic table 50 begins to rise, means enter into operation that swing the L-shaped arms inwardly so that their rounded corner edges 226 bear against the end walls of a case upon the anvil blocks 134a and 134b and properly center the case in the direction transversely of the machine. For this purpose the outwardly projecting bar 224 of each of the arms 218a, 219a, 218b and 219b is pivotally connected to the lower end of a rod 228 whose upper end is loosely received and projects upwardly through an aperture 230 provided in a respective one of two symmetrically arranged horizontal plates 232a and 232b that are disposed a distance above the level of the table 50 in its lowermost position and which remain stationary during an initial phase in the upward movement of said table. A strong spring 234 tensioned between the outwardly projecting, horizontal bar of each centering arm 218a, 219a, 218b and 219b, and a point on the respective mounting plate 146a or 146b, as the case may be, below said bar urges each arm in a counterclockwise direction as viewed in Fig. 25 tending to project its rounded corner edge 226 through the recess 222 into the space between the mounting plates 146a and 146b, but a nut 236 engaged over each rod 228 directly above the plate 232a or 232b prevents rotation of the arm in an inward direction as long as the table 50 is in its lowermost position wherein the anvil 51 supported therefrom is in condition to receive a case from the receiving conveyor B. As soon as the table 50 rises, however, and the vertical distance between the mounting plates 146a, 146b thereof and the stationary overhead plates 232a, 232b is reduced (Fig. 26), the rods 228 are no longer capable of blocking rotation of the L-shaped arms under the urgency of springs 234 and said springs swing said arms inwardly and bring their rounded corner edges 226 from opposite directions against the end walls of the case on the anvil blocks 134a and 134b which is effective to shift the case transversely on said blocks until it is properly centered with regard to the vertical longitudinal plane of symmetry of the machine.

The first strap bending operation

As the hydraulic table 50 commences to rise, it raises the case situated upon the anvil blocks 134a and 134b until it comes against the previously mentioned retaining block 54 which is composed of two halves 55a (Fig. 2) and 55b that are held a predetermined distance above the level of the anvil 51 in its lowermost position (Figs. 10 and 11). The retaining blocks 55a and 55b are secured to the hereinbefore mentioned horizontal plates 232a and 232b, respectively, and these, in turn, are secured to the upper ends of slides in the form of vertically disposed elongated rectangular blocks 238a and 238b (Fig. 2) that are provided with vertically extending lateral guide grooves 240 and 242 (Figs. 19, 20 and 27) which are engaged by ledges 244 and 246, respectively, that are bolted to the outer faces of the respective mounting plates 146a and 146b of table 50.

At its lower end each slide 238a, 238b is provided with a pawling mechanism 248 that holds it to the base structure 56 of the machine until the pressure exerted against the retaining blocks 55a and 55b at its upper end by the case upon the anvil blocks of the rising table 50 exceeds a predetermined limit. Having reference to Figs. 14 and 27, each slide carries adjustably secured thereto mounting blocks 250 and 252, and pivoted to said mounting blocks are the upper ends of symmetrically bent arms 254 and 256. Pivotally supported from the lower ends of said arms are latch dogs 258 and 260 having inwardly projecting noses 262 and 264, respectively, and when the slide is in its initial lowermost position wherein its bottom face rests upon a rubber cushion 265 as shown in Figs. 14 and 27, a spring 266 tensioned between the arms 254 and 256 holds the noses 262 and 264 of said dogs with their horizontal upper surfaces 268 below rollers 270 and 272, suitably mounted in the stationary base structure of the machine. Strong spring means 274 and 276 of adjustable force are arranged to oppose such rotation of the latch dogs relative to their supporting arms, as would withdraw their noses from underneath the rollers 270 and 272 in case a force is applied to the slide that endeavors to raise it above the rubber cushion 265.

Reverting to the rising table 50 and the case upon the anvil blocks 134a and 134b that are yieldably supported from and above the table, when the case comes against the retaining blocks 55a and 55b at the upper end of the slides 238a and 238b with said slides tied to the base structure of the machine by the described pawling mechanism 248, the anvil supporting springs 148 and 150 will be compressed, provided the springs 274 and 276 of the pawling mechanisms are sufficiently strong as compared with said anvil supporting springs 148 and 150, and the case and the anvil blocks upon which it is supported come to a temporary halt, but the table 50 continues to rise, compresses the springs 274 and 276 and moves closer to the anvil blocks 134a and 134b. When this occurs, the inner ends of the bending levers 180 and 182 at the upper ends of arms 184 and 186 bear against the side portions of the floor or bottom wall of the case on the anvil blocks and swing upon their pivots into the upright position illustrated in Fig. 12, thus bending the projecting end portions of the straps against the side walls of the case. To maintain the anvil blocks 134a and 134b and the rising table 50 in their proper relation with each other in a direction vertically of the machine during their relative approach, each of the anvil blocks may be provided along its outer side face with two guide blocks 277 (Figs. 21 and 22) which engage vertical guide slots 279 that are formed in the adjacent mounting plates 146a and 146b (Figs. 10, 14 and 20).

To assure that the upwardly bent strap portions are brought tightly against the side walls of the case, the springs 220 which hold the support arms for the bending levers yieldably in upright position should be sufficiently strong, and the position of said support arms relative to the side walls of the case on anvil blocks 134a and 134b should be so adjusted by manipulation of the nuts 202 that said arms must be forced to yield a limited distance outwardly away from the ends of their respective anvil blocks before the case may reach the position illustrated in Fig. 12 wherein it is seated fully between the bending levers 180 and 182, with said levers bearing against its end walls. The yieldable arrangement of the support arms for the bending levers has the added advantage that the described strap bending mechanism is capable of handling cases that vary somewhat in width.

The mechanism for bending the straps over the upper end edges of the case

It remains to bend the upper extremities of the vertically extending end portions of the straps over the upper side edges of and into contact with the upper end edges of the case on the anvil blocks 134a and 134b (Fig. 18). For this purpose the outer or upper end of each bending lever 180 and 182 carries pivotally secured thereto a bending arm 280 in the form of a beaked head whose beak portion 282 points in an upward direction when the bending levers are in the horizontal position illustrated in Figs. 10 and 11, but points inwardly, i. e., toward the case on the anvil blocks, when the bending levers are in the upright position illustrated in Fig. 12. Having reference to Figs. 20 and 22, each bending lever is recessed along the upper end of its back edge 284 as shown at 286, and carries in the side walls of the recess 286 a transverse pin 288 upon which is pivotally supported the stem or neck 290 of the associated beaked head 280. Excessive rearward rotation of the head 280 upon pin 288, when the bending levers are in their reclined horizontal positions, is prevented by rotation-limiting engagement of a flat edge portion 292 of the stem 290 with the front wall 294 of the bending lever, and in addition the mounting plates 146a and 146b of the hydraulic table 50 may carry seats 296 adjustably secured thereto upon which the heads 280 of the bending levers may rest, when said levers are in their reclined horizontal positions as shown in Figs. 10, 11, 21 and 22.

To prevent the leading edge of a strap from being caught on the beaks 282 of the heads 280 on the bending levers at the case supply side of the machine, when a strap is slid underneath a case on anvil blocks 134a and 134b and is pushed into engagement with the stop block 164 in guide channel 162a or 162b, as the case may be, the outer or upper ends of the bending levers 182 on the feed side of the machine are preferably provided with guide pins 298, respectively, that extend over the beaks 282 of said heads when the bending levers are in their reclined position flush with the anvil blocks 134a or 134b and the guide channels 162a and 162b, respectively (Figs. 10 and 12).

Reverting to the continued upward movement of the hydraulic table 50, when the bending levers 180 and 182 have reached the position illustrated in Fig. 12 and the projecting end portions of the straps are held firmly against the side walls of the case, vertical studs 300 adjustably mounted in ledges 301 (Fig. 20) on the mounting plates 146a and 146b of table 50 come into contact with the bottom surfaces of the anvil blocks 134a and 134b and force the case resting upon said blocks positively aganist the retaining blocks 55a and 55b. Under this condition, the spring means 266, 272 and 274 on pawling mechanism 248 are unable to hold the dogs 258 and 260 in latching position (Figs. 12 and 28). The pressure of the horizontal upper surfaces 268 of their noses 262 and 264 against the rollers 270 and 272, respectively, forces their upper ends to swing inwardly and bear against L-shaped stop members 302 and 304 that are adjustably secured to the slide 238a or 238b, as the case may be; and since said stop members are immovable, the arms 254 and 256 are forced apart against the urgency of spring means 274, 276 and spring 266, as shown in Figs. 12 and 28, causing the noses 262 and 264 to move laterally away from the rollers 270 and 272, respectively, and clear said rollers in upward direction. As a result thereof the retaining blocks 55a and 55b on overhead plates 232a and 232b may yield upwardly and allow the case and the anvil blocks to rise in unison with the hydraulic table while strong springs 311 tensioned between the overhead plates 232a, 232b and the base structure of the machine maintain said anvil blocks and the table 50 in their relatively approached condition so that the bending levers 180 and 182 ramain in their effective vertical positions. When the noses of the latch dogs 262 and 264 have negotiated the rollers 270 and 272 during their upward movement, they return to their initial position under the force of spring 266, and the stop members 302 and 304 hold the arms 254 and 256 sufficiently far apart against the force of said spring 266 to bring the slanting lower surfaces 310 on the noses of the latch dogs 258 and 260 against the rollers 270 and 272, respectively, during downward movement of the slides 238a and 238b. Hence, at the end of each operational cycle of the machine, the arms 254 and 256 may be cammed outwardly and the noses may descend below, and re-engage beneath, said rollers 270 and 272 to ready the described mechanisms for another operational cycle in the performance of the machine.

Reverting again to the upward movement of the hydraulic table 50 with the anvil blocks 134a and 134b in depressed condition, when the bending levers 180 and 182 have reached the vertical position illustrated in Fig. 12 wherein they hold the end portions of the reinforcing straps tightly against the leading and trailing side walls of the case on the anvil blocks, the beaks 282 of the heads 280 on said bending levers engage the upwardly projecting ends of the straps; and as the hydraulic table continues to rise and forces the anvil blocks and the case resting thereon positively in upward direction, cam follower rollers 312 pivotally mounted in recesses 314 provided in the crest portions of the lever heads 280 (Fig. 20) encounter obliquely rising camming edges 316 provided at the lower ends of bayonet-shaped camming bars 318 that are supported from the super-structure 60 of the machine. As the hydraulic table continues to rise, said camming edges 316 force the beaked heads 280 to swing inwardly toward the case on anvil blocks 134a and 134b. This causes their beaks 282 to bend the upwardly projecting end portions of the straps over the upper edges of the leading and trailing side walls of the case (Fig. 23) until the flat under surfaces 319 of the beaks bear fully upon the strap ends and press them tightly against the upper edges of the end walls of the case, while short surfaces 320 adjoining the flat under surfaces of the beaks and extending at right angles thereto hold the upper ends of vertically extending strap portions firmly against the side walls of the case (Figs. 13 and 20).

To enable the above described bending movement of the beaked heads 280 on the bending levers 180 at the feed side of the machine in spite of the presence of the hereinbefore described guide pins 298 at the upper ends of said levers, the beak portions 282 of said heads may be split to form a center recess 321 into which the pins 298 can enter during inward rotation of the heads as best shown in Fig. 23.

To guide the upwardly projecting end portions of the straps during the described bending operation dependably and accurately into contact with the upper end wall edges of the case, guide funnels 322 may be provided above the end walls of the case near the four corners thereof. As shown in Figs. 23 and 24, each of said guide funnels may comprise a vertically disposed, elongated plate 323 that is slidably received in a frame 324 and which presents a dove-tailed recess 325 to the top edge of the case end wall. The frame 324 is supported from an upwardly yielding slide carriage 326 that is mounted in and forms part of the superstructure of the machine and which carries the nail holding chucks 58 as will be explained hereinafter. Said frame 324 supports the plate 323 in such a manner that its recess 325 is disposed transversely above the end wall of the case but the entrance 327 to said recess is narrower than the width of the case end wall so that the plate 323 may rest upon the wall. Secured to the outwardly directed face of the plate 323 adjacent the side edges of the dove-tailed recess 325 are metal strips 328 and 329 that form funnelling surfaces which converge toward and terminate with the side edges of said recess 325. Spring means 330 urge the plate 323 in a downward direction relative to its guide frame 324 to an extent determined by engagement of a stop ledge 331 on said plate 323 with a stop ledge 332 on the frame 324. When the recessed plate 323 is in its lowermost position as determined by engagement of stop ledge 331 with stop ledge 332, its lower edge is positioned at substantially the same level as the camming edge 316 of the adjacent bayonet cam 318 (Figs. 10 and 23). Hence, when a roller 312 on the head 280 of a bending lever 180 or 182 encounters the camming edge of its respective bayonet cam 318 and in consequence thereof the beak 282 on said head begins to force the upper extremity of a strap inwardly toward the upper end wall edge of a case on rising anvil 51, the sliding plate 323 rests loosely upon said end wall edge and during further upward movement of anvil 51 and the resultant bending of the strap, the converging surfaces presented to the strap end by the metal strips 328 and 329 guide the strap securely into contact with the upper edge of the end wall of the case while the plate 323 yields upwardly under the force of the rising anvil 51 against the urgency of spring means 330.

To avoid the bayonet cams 318 from encountering the bending levers 180 or 182 in their reclined positions in the event that the machine of the invention goes accidentally through an operational cycle with no case placed upon the anvil blocks, means are provided that operate to raise the bending levers into their vertical positions even though there may be no case to bear against their inner ends. For this purpose the inner end of each bending lever 180 or 182 carries a laterally projecting stud 336 that extends through a suitable aperture 338 in the adjacent mounting plate 146a or 146b of the hydraulic table 50 (Fig. 20) and pivotally engaged over the projecting end of each such stud 336 by means of a sleeve 340 is an upwardly extending rod 342 that is slidably received in a suitable aperture 344 in the hereinbefore mentioned overhead plate 232a or 232b at the upper end of the slide 238a or 238b, respectively (Figs. 14 and 15). Adjustably secured to each of the four rods 342 comprised in the machine of the invention a suitable distance below the plates 232a and 232b in their initial position, i. e., with the slides 238a and 238b latched to the base structure 56 of the machine, is a collar 346 of such size that it cannot pass through the aperture 344 in the plate 232a or 232b, as the case may be. Thus, when the hydraulic table 50 commences to rise at the beginning of an operational cycle of the machine, when the slides 238a and 238b are still latched to the base structure 56, the four rods 342 comprised in the machine are moved upwardly relative to the stationary plates 232a and 232b until the collars 346 strike from below against said plates when the rods can rise no further. Then, as the hydraulic table 50 and the bending levers 180 and 182 pivotally supported therefrom continue to rise, the rods 342 exert a downward pressure upon the inner ends of said levers, which causes them to swing into an upright position, as if they had encountered the projecting end portions of case on anvil 51.

For reasons of safety, the bayonet cams 318 may also be mounted in such a manner that they will yield upwardly whenever they encounter an upwardly directed force of predetermined strength. Having reference to Fig. 14, each of the bayonet-shaped cams 318 is provided with an elongated slot 348 through which it is attached to the slide carriage 326 of the machine by means of a screw bolt 349 that engages the slot 348 near its upper end. To prevent upward movement of the cam along its slot 348 under normal conditions of operation, the bolt 349 extends also through a plate 350 that is secured to the cam 318 by a pin 351 of limited strength. Thus, whenever the cam encounters an upwardly directed force of excessive strength, the pin 351 is sheared off and the cam is free to move upwardly along the distance corresponding to the length of its slot 348.

To accommodate variations in the width of the cases to be strapped, the bayonet cams 318 may also be mounted in such a manner that they will yield laterally to a limited extent in a direction outwardly of the machine. Having again reference to Fig. 14, the superstructure 60 of the machine forms an ear 352 a limited distance removed from the outer edge of each bayonet cam 318. Threadedly received in each ear 352 is a screw bolt 353 and coiled around said screw bolt and compressed between the ear 352 and an inward projection 350a on the plate 350 is a spring 354 that forces the projection and plate inward and therefore urges the cam 318 yieldably into its effective position against an adjustable stop member 355, and which permits said cam to yield outwardly away from said stop member 355 to an extent determined by the inner extremity of the adjustable screw bolt 353.

The nailing mechanism

With the straps bent fully around the ends of the case on the anvil blocks 134a and 134b and their end portions held tightly against the upper edges of the case end walls by the beaks 282 of lever heads 280, the case is now ready to have the end portions of the straps nailed onto its end walls (Fig. 13). This is accomplished in the conventional manner by continued elevation of the hydraulic table 50 which brings each of the end walls of the case against two of the hereinbefore mentioned nail holding chucks 58 that are supported from the slide carriage 326 which is mounted for upwardly yielding vertical movement in the superstructure 60 of the machine as previously pointed out. Rigidly supported from said superstructure 60 are the beforementioned immovable nailing rods 62, with their lower ends slidably received within the chucks 58 and disposed above the nails held therein. As the hydraulic table 50 continues to rise and the strapped end edges of the case on anvil blocks 134a and 134b engage the upwardly yielding chucks 58 and lift said chucks, the nails contained therein come against the lower ends of the immovable rods 62 and, as a result thereof, the nails are driven through the bent upper ends of the straps and into the end walls of the case. Nailing mechanisms of this type and the manner in which they operate and are supplied with fresh nails are well known in the art and are described, for instance, in U. S. Patent application of E. A. Verrinder et al., Ser. No. 308,785, filed on September 10, 1952 for a "Machine for Nailing Lids on Boxes," now Patent No. 2,723,393, issued November 5, 1955, to which reference is made for details.

The hydraulic system

The hydraulic system employed to operate the table 50 is illustrated in Figs. 5 and 29 to 32. It comprises a high volume pump 400 and a low volume pump 402 which draw hydraulic fluid from a common reservoir 403 and which may both be driven from the same motor 74 that drives the receiving conveyor B as shown in Figs. 5 and 16. During performance of the machine both pumps are continuously in operation and at the beginning of each operational cycle of the machine, when the hydraulic table is at rest in its lowermost position, the output of both pumps is delivered into a common conduit 404 that leads into the hydraulic cylinder 53 at the bottom end thereof, but the open valve 208 in a by-pass line 408 permits the hydraulic fluid to return ineffectively to the reservoir 403 (Fig. 29). The valve 208 comprises a control body 412 and a spring 414 arranged to urge the control body into a position wherein it closes the valve 208, but the valve is held open against the urgency of spring 414 by a lever train collectively identified by the reference number 416 in Figs. 2 and 5. After a case has been placed upon the anvil blocks 134a and 134b in its proper position longitudinally of the machine and straps have been slid underneath the opposite ends of the case, the lever train 416 may be actuated by the attendant to permit the control body 412 to follow the urgency of spring 414 and initiate elevation of the hydraulic table 50.

Having reference to Figs. 2 and 5, said lever train 416 comprises the hereinbefore-mentioned pedal 206 that is rigidly secured to and projects forwardly from a transverse spindle 420 which is rotatably supported from the base structure 56 of the machine at the front end thereof. Said spindle carries a rearwardly directed arm 422 to which is pivotally connected a vertically rising rod 424 whose upper end extends loosely through an apertured lug 425 that is rigidly secured to the base structure 56, and through an apertured lever arm 426 that is disposed above said lug. At its upper extremity the rod 424 is provided with a cross bar 428 that overlies the lever arm 426, and a spring 430 coiled around the rod 424 and compressed between the stationary lug 425 and a collar 432 secured to the rod 424, urges said rod and hence the lever arm 426 engaged by cross bar 428 in a downward direction. The lever arm 426 is rigidly secured to and projects forwardly from another transverse spindle 434 that is rotatably supported from the base structure 56 a distance above spindle 420. Said spindle 434 carries firmly secured thereto a lever arm 436 that extends in a direction opposite to lever arm 426. The lever arm 436 is connected by means of a short length of chain 438 to the control body 412 of valve 208 in such a manner that the force of spring 430 around the rod 424 effectively opposes the urgency of spring 414. Thus, by making the spring 430 around the rod 424 sufficiently strong the valve 208 may be held open against the urgency of spring 414.

To start elevation of the hydraulic table 50, the attendant steps upon the pedal 206, as previously pointed out. This raises the rod 424 against the urgency of spring 430 and removes the rotation arresting cross bar 428 from lever arm 426. As a result, spring 414 moves the control body 412 toward its valve blocking position. However, the spindle 434 carries a two-toothed ratchet 440, and before movement of the control body 412 under the urgency of spring 414 can fully close the control valve 208, one tooth 442 of said ratchet comes against a latch dog 444, which is urged into ratchet-latching position by a spring 446 (Fig. 29). Hence, the control valve 208 is only partially closed so that a portion of the output of pumps 400 and 402 is still permitted to return ineffectively to the reservoir 403. The remainder, however, is forced to enter the hydraulic cylinder 53 and effects gradual elevation of the hydraulic table 50. By the described arrangement the rising table 50 brings a case resting upon the anvil blocks 134a and 134b without excessive impact against the retaining blocks 55a and 55b. After the case has made contact with the retaining blocks 55a and 55b and the pawling mechanisms 248 at the bottom of slides 238a and 238b have released their grip on the rollers 270 and 272, the table 50 may be raised rapidly to complete the strap bending operation in a minimum of time. To this end the latch dog 444 (Fig. 33) is rigidly secured to a sleeve 448 which is engaged loosely over a stud 450 that projects laterally from a part 452 of the base structure 56 of the machine. The sleeve 448 carries a vertically rising arm 454 whose upper end is bent to form an actuating knee 456 that lies in the path of a camming ledge 458 which is secured to the hydraulic table 50. When the table 50 reaches a predetermined level, said ledge 458 engages the knee 456 and kicks the latch dog 444 out of engagement with the tooth 442 of ratchet 440. In consequence thereof the valve spring 414 can now move the control body 412 of valve 208 fully into valve-closing position, and with the control valve 208 completely closed, the full output of both pumps 400 and 402 is delivered into the hydraulic cylinder 53 as illustrated in Fig. 31 causing the table 50 to rise rapidly.

After the straps have been bent fully around the ends of the case on the anvil blocks 134a and 134b, and the hydraulic table 50 has lifted the upper end wall edges of the case against the nail holding chucks 58, causing the nails in the chucks to encounter the immovable nailing rods 62, increased force is necessary to drive the nails through the strap ends and into end walls of the case. For this purpose, means are provided that return the output of the high volume pump 400 directly to the reservoir 403 as soon as the load encountered by the rising table reaches a predetermined limit, whereafter the low volume pump 402 raises the table by itself at a reduced rate of speed and with increased power. To this end the output conduit 460 of the high volume pump 400 may contain a normally open pilot valve, indicated by block 462 in Figs. 29 to 32, that is controlled by the pressure in the supply line 404 to the hydraulic cylinder 53, as indicated by the auxiliary conduit 464 in Figs. 29 to 32. When the nails in the chucks 58 encounter the immovable nailing rods 62, the resistance to the entrance of fluid into the hydraulic cylinder 53 increases sharply. The resultant pressure increase in supply conduit 404 is applied to the pilot valve 462 through conduit 464 and operates said valve to direct the output of pump 400 through a by-pass line 466 to the reservoir 403 as illustrated in Fig. 31, so that it is now the low volume output of pump 402 alone that is delivered into the hydraulic cylinder 53. This causes the plunger 52 to rise at a reduced rate and with correspondingly increased force until the nails are driven through the strap ends and into the end walls of the case.

To effect reversal of the hydraulic table 50, after the nailing operation has been completed, it is necessary that the spindle 434 be rotated in clockwise direction, as viewed in Fig. 5, to open the control valve 208 against the urgency of its spring 414 in order that the output of pump 402 may by-pass the hydraulic cylinder 53 ineffectively and that the fluid in the cylinder may escape from said cylinder under the weight of table 50. For this purpose the spindle 434 may be provided with a rearwardly projecting arm 470 (Fig. 5) containing a slot 472 that is loosely engaged by a vertically rising rod 474 which may have a centrally positioned joint 475 and whose lower end carries a cross bar 478. In upward direction said rod 474 extends freely through an apertured bar 480 which is rigidly connected to the hereinbefore mentioned slide carriage 326 from which the nail chucks 58 are suspended. At its upper end rod 474 is pivotally connected to an intermediate point 482 of a one-armed lever 484 that is pivoted to a stationary part 486 of the superstructure 60 of the machine. Coiled around rod 474 between bar 480 of the slide carriage 326 and a collar 488 secured to the rod 474 is a spring 490. Normally, upward movement of rod 474 is positively prevented by a latch dog 492 that is pivoted to a stationary part 494 of the superstructure 60 and which engages, with a latching nose 496, the free end of lever 484 under the urgency of a spring 498.

As the slide carriage 326 in the superstructure of the machine is raised by engagement of the case on the rising anvil blocks with the nail chucks 58 that are supported from said carriage, the resultant upward movement of bar 480 effects compression of spring 490 against the collar 488 on rod 474 which is unable to move upwardly due to engagement of the free end of lever 484 at its upper extremity with the nose 496 of latch dog 492, as pointed out above. When the hydraulic table 50 has reached its maximum elevation, however, and the nails are fully driven into the end walls of the case, a vertical stud 500 rigidly supported from the slide carriage 326 is arranged to strike against an ear 502 formed on the side of latch dog 492, and kicks the nose 496 of said dog out of latching engagement with the lever 482. As a result thereof, the highly compressed spring 490 is free to expand and pulls rod 474 rapidly in upward direction which causes the cross bar 478 at the lower end of rod 474 to raise the lever arm 470 and swing the spindle 434 in clockwise direction as viewed in Fig. 5, or counterclockwise direction as viewed in Figs. 31, 32 and 33. This returns the control body 412 of the valve 208 against the urgency of its spring 414 to the position wherein the valve is fully opened as shown in Fig. 32, and in consequence thereof the output of the low volume pump 402 is returned to the reservoir 403, and the fluid previously delivered into the hydraulic cylinder may escape from the cylinder and return also to the reservoir 403. With the pressure in the supply line 404 to the hydraulic cylinder 53 relieved, the pilot valve 462 returns to its initial position of adjustment wherein the output of the high volume pump 400 is directed to the supply conduit 404 of the hydraulic cylinder, but by-passes the cylinder and returns to the reservoir 403 through opened control valve 208.

To maintain the control valve 208 in fully opened condition during the resultant descent of the hydraulic table 50, against the urgency of valve spring 414, a latch dog 504 pivotally supported from the base structure 56 of the machine and urged against the surface of ratchet 440 by suitable spring means 506 may be arranged to engage behind another tooth 508 of said ratchet, whenever the spindle 434 is turned by the release of spring 490 at the end of the table-lifting phase in the operational cycle of the machine; also the attendant may release the pedal 206 enabling the coil spring 430 to oppose the valve spring 414 in the manner previously described. As the table 50 regains its lowermost position at the end of each operational cycle of the machine, a stud 510 supported from the hydraulic table 50 may be arranged to engage a shelf 512 secured to latch dog 504 and kick it out of engagement with ratchet tooth 508, as shown in Fig. 29, so that the machine is fully reconditioned for another operational cycle.

*Operation*

While the operation of the case strapping machine embodying the invention has been explained concurrently with the above given description of its component mechanisms, it will be briefly recapitulated hereinafter for a better understanding of the invention:

To start operation of the machine the motor 74 (Figs. 5 and 16) is set into motion in the conventional manner by closing a switch 520 of its control circuit 522. Operation of motor 74 turns the receiving conveyor B in the machine and also operates the two pumps 400 and 402 of the hydraulic system E, but the hydraulic table 50 remains in its lowermost position due to the fact that the control valve 208 is held open by spring 430 in the lever train 416 that may be actuated by the pedal 206 in front of the machine.

A case placed upon the continuously operating case supply conveyor A in transverse position passes from the leading end of said conveyor over the knurled roller discs 178a and 178b (Fig. 3) onto the receiving conveyor B and strikes against the actuating arch 108 of latch release lever 106 (Fig. 6). As a result thereof the latch nose 100 is withdrawn from the upper edge 98 of plate 96 and the springs 90a and 90b raise the rollers 78a and 78b above the level of the case supply conveyor A while the case is still in the process of passing from the case supply conveyor onto the receiving conveyor B. In consequence thereof the trailing side of the case is lifted as shown in Fig. 7, which speeds up the delivery of the case into its proper position on the receiving conveyor B and dependably blocks entry of a succeeding case into the machine, even if it followed the first case with its leading side in contact with the trailing side of the first case.

Upon the receiving conveyor B the case strikes with its leading side against the stop rollers 110a and 110b which yield to a limited extent to soften the impact of the empty case and arrest the case positively in its proper position longitudinally of the machine. In this position the case has released the actuating arch 108 of the latch release lever 106, but the latch nose 100 is unable to re-engage the plate 96 of carriage 81 and the rollers 78a and 78b remain in their elevated case-blocking position.

Now the attendant slides metal straps underneath the opposite ends of the case until their far end edges come against the stop blocks 164 in the guide channels 162a and 162b at the case supply end of the machine. This locates the straps properly with regard to the case in a direction longitudinally of the machine. Then the attendant depresses the pedal 206 at the front end of the machine which causes partial closure of the control valve 208 in the hydraulic system of the machine. Part of the output of pumps 400 and 402 is therefore delivered into the hydraulic cylinder 53 and the table 50 begins to rise. When this occurs the anvil blocks 134a and 134b rise above, and lift the case, from the receiving conveyor. At the same time the retaining rods 228 of the case centering mechanism F slide upwardly within the overhead plates 232a and 232b and the springs 234 may therefore swing the L-shaped arms 218a, 219a, 218b and 219b in such a manner that their rounded corner edges bear against the end walls of the case on the anvil blocks and center the case with regard to the longitudinal vertical plane of symmetry of the machine (Figs. 24, 25 and 26).

As the hydraulic table continues to rise, the case upon the anvil blocks 134a and 134b comes against the retaining blocks 55a and 55b (Fig. 11) and upward movement of the case and its supporting anvil blocks is temporarily arrested, although the table 50 continues its upward movement. The resultant relative approach of the table 50 and the anvil blocks 134a, 134b against the urgency of springs 148 and 150 brings the projecting side portions of the case on the anvil blocks against the inner ends of the strap bending levers 180 and 182 causing said levers to swing about their pivotal connections to the upper ends of support arms 184 and 186, respectively, into vertical position and bend the projecting end portions of the straps against the leading and trailing side walls of the case.

By the time the described bending operation is completed, the studs 300 on the rising table 50 come against the lower surfaces of the anvil blocks 134a and 134b and continued upward movement of the table forces the case on the anvil blocks positively against the retaining blocks 55a and 55b. This causes the pawling mechanisms 248 at the bottom of slides 238a and 238b to yield, and the retaining blocks 55a and 55b are therefore released for upward movement in unison with hydraulic table 50, anvil blocks 134a, 134b and the case supported thereon, while the springs 311 maintain the relatively approached relation of the table and the anvil blocks which placed the bending levers 180 and 182 into their vertical positions adjacent the side walls of the case (Fig. 12).

At the same time the ledge 458 on the rising table 50 disengages the latch dog 444 from ratchet 440 (Fig. 33) enabling spring 414 to close the control valve 208 in the hydraulic system E completely so that the full output of both pumps is now directed into the hydraulic cylinder 53. The resultant rapid rise of the hydraulic table 50 brings the heads 280 of the bending levers 180 and 182 against the oblique camming edges 316 of the bayonet cams 318 that are suspended from the superstructure 60 of the machine. This causes the heads 280 of the bending levers to swing inwardly and bring their beaks 282 against the upwardly projecting ends of the straps until said ends are bent into contact with the upper edges of the side walls of the case (Fig. 13).

Further upward movement of the hydraulic table 50 brings the strapped upper edges of the case end walls into contact with the nail chucks 58 and lifts said nail chucks until the heads of the nails contained therein come against the lower ends of the nailing rods 62 that are immovably supported from the superstructure 60 of the machine.

The added resistance offered to the rising table by the nails that engage the strapped end edges of the case and which can yield no further due to the presence of the nailing rods above them, causes actuation of the pilot valve 462 in the hydraulic system causing said valve to by-pass the output of the high volume pump 400. It is now the low volume pump 402 alone which forces the table 50 and hence the case supported therefrom at a reduced speed and with increased power against the immovable nails in the upwardly yielding nailing chucks 58. As a result thereof the nails are driven through the strap ends and into the end walls of the case, and when the upper edges of the case reach the level of the lower ends of the nailing rods 62 which indicates that the nails have been driven fully into the case, the stud 500 on the upwardly sliding carriage 326 for the chucks 58 strikes against ear 502 on latch dog 492 (Fig. 5) and causes said latch to release the lever 484 on the upper end of rod 474. This enables the compressed spring 490 to effect opening of the control valve 208 in the hydraulic system and the hydraulic table begins to descend. The case strapping and nailing operation is completed.

As the hydraulic table begins to descend, the nailing chucks 58 are permitted to return to their initial level, and as the slides 238a and 238b approach their lowermost positions, the oblique camming surfaces 310 on the noses of the latch dogs 258 and 260 engage the rollers 270 and 272 and cause the arms 254 and 256 to swing outwardly against the urgency of spring 266; and as soon as said noses have dropped below the rollers 270 and 272, said spring 266 engages their latching surfaces 268 beneath said rollers. Thus, the slides 238a and 238b are again securely latched to the base structure of the machine so that the retaining blocks 55a and 55b at their upper ends may again take an effective part in the strap bending process during the next operational cycle of the machine.

As the hydraulic table 50 continues its descent, after the slides 238a and 238b and the retaining blocks 55a and 55b have reached their lowermost positions, the springs 148 and 150 raise the anvil blocks 134a and 134b relatively to said table so that they remain stationary in space during further descent of the table. By this time, the heads 282 of the bending levers 280 have dropped below the reach of the bayonet cams 318, and as the table 50 continues to descend, the lever heads 282 are moved outwardly away from the top edges of the strapped case, and with the lower ends of the bending levers 280 dropping below the side portions of the case on the stationary anvil blocks, said levers swing outwardly away from the case until they regain their initial horizontal position, with their reclined heads 280 resting upon the seats 296 of mounting plates 146a and 146b (Fig. 11). Then, after the springs 148 and 150 have re-established the initial relation between the anvil blocks 134a and 134b and the hydraulic table 50, further descent of the latter causes the anvil blocks to resume their descent in unison with the table.

As the anvil blocks 134a and 134b approach the level of the chains 66a and 66b of continuously operating conveyor B, the case resting on said anvil blocks bears with a leading area of its floor or bottom wall upon the stop rollers 110a and 110b, since the springs 120 have restored the supporting arms 112a and 112b of said rollers to their vertical position while the case was lifted above the chains of conveyor B. During further descent of the hydraulic table the case therefor depresses the rollers 110a and 110b against the urgency of said springs 120 and with said rollers no longer in a position to retain the strapped case, the chains of conveyor B take hold of the case and eject it through the front end of the machine onto a suitable platform or take-off conveyor (not shown).

During the final phase in the descent of the hydraulic table 50, the latch nose 100 on bell crank 102, which is supported from the table 50 as previously pointed out and which is held in effective position by spring 104 as soon as a case has passed over the actuating arch 108 of its release lever 106, descends upon the upper edge 98 of plate 96 and forces said plate and the slide carriage 81 downwardly into a position wherein the rollers 78a and 78b are submerged below the upper run of the case supply conveyor A. As a result thereof, said conveyor may now deliver another case over the knurled rollers 178a and 178b onto the receiving conveyor B and against the positioning rollers 110a and 110b in the machine. Another cycle in the performance of the machine has commenced.

The described machine straps and nails cases in an accurate, quick and efficient manner. It has the added advantage that it is capable of processing cases that may vary slightly in width, due to the fact that the support arms 184 and 186 for the bending levers 180 and 182 and the bayonet cams 318 may yield outwardly away from the side walls of the case on the anvil blocks 134a and 134b. It may readily be adjusted to handle cases of different size. Thus, the machine may be adjusted to handle cases of different height by adjusting the length of the studs 300 which strike against the anvil blocks 134a and 134b when said blocks hold a case against the retaining blocks 55a and 55b or by providing shorter studs 528 on the stud supporting ledges of the table plates 146a and 146b as indicated in Figs. 10, 11, 12, 13 and 23, which become effective when the longer studs 300 are removed. To enable the machine to handle cases of different length in a direction transversely of their advance on conveyor B, it is only necessary to vary the distance of the mounting plates 146a and 146b from each other in a direction transversely of the machine. For this purpose the mounting plates 146a and 146b may be arranged to slide upon the transverse bars 127 and 128 of the frame 125 of table 50 (Fig. 5) and to facilitate adjustment of their position on said bars relative to each other, said plates may be provided with blocks 530a, 532a and 530b, 532b (Fig. 3) at the opposite edges in which are threadably engaged the oppositely threaded opposite ends of transverse rods 534 and 536. The rods 534 and 536 may be effectively connected for rotation in unison by a sprocket chain 538 that is trained around sprockets 540 and 542 that are firmly mounted upon the rods 534 and 536, respectively.

Thus, by turning one of the rods 534 or 536 in an appropriate manner by means of a crank or like mechanism (not shown) the two mounting plates may be moved farther apart or closer together to adjust the various case centering and strap bending mechanisms supported therefrom to cases of greater or shorter length. It is then only necessary to adjust the position of the bayonet cams 318, strap end guiding funnels 322, the nailing chucks 58 and nailing rods 62 in the superstructure of the machine correspondingly.

While I have described my invention with the aid of a preferred embodiment thereof, it will be understood that the invention is not limited to the constructional details shown and described by way of example which may be departed from without departing from the scope and spirit of my invention.

I claim:

1. A machine for bending a strap around a case comprising a table operable to rise from a lower position to a higher lever, an anvil for a case to rest upon yieldably supported above said table, case-arresting means disposed above said anvil to arrest upward movement of a case on said anvil and thus cause relative approach of the rising table and the yieldable anvil, and strap bending mechanisms at one end of the anvil effective in response to relative approach of said anvil and said table to bend a projecting end portion of a strap underneath the case on said anvil into contact with the adjacent side wall of the case.

2. A machine for bending a strap around a case comprising a table operable to rise from a lower position to a higher level, an anvil for a case to rest upon yieldably supported above said table, releasable case-arresting means disposed above said anvil to arrest upward movement of the case on said anvil during an initial phase in the upward movement of said table and thus cause relative approach of the rising table and the yieldable anvil, a first strap bending mechanism at one end of the anvil effective in response to relative approach of said anvil and said table to bend a projecting end portion of a strap underneath the case on said anvil into contact with the adjacent side wall of the case so that its end projects a limited distance above the top surface of the case, means effective upon closer approach of said table and said anvil to cause release of said arresting means, and a second strap bending mechanism operative upon release of said arresting means and consequent upward movement of said anvil to bend the upwardly projecting end of the strap into contact with the upper surface of the case on said anvil.

3. A machine for bending a strap about a case comprising a table operable to rise from a lower position to a higher level, an anvil for a case to rest upon yieldably supported above said table, releasable case-arresting means disposed above said anvil to arrest upward movement of the case on said anvil during an initial phase in the upward movement of said table and thus cause relative approach of the rising table and the yieldable anvil, first strap bending mechanisms at the opposite ends of the anvil effective in response to relative approach of said anvil and said table to bend the oppositely projecting end portions of a strap underneath the case on said anvil into contact with the side walls of the case so that their ends project a limited distance above the top surface of the case, means effective upon continued approach of said table and said anvil to cause release of said arresting means, and second strap bending mechanisms operative upon release of said arresting means and resumed upward movement of said anvil to bend the upwardly projecting ends of the strap into contact with the upper surface of the case on said anvil.

4. A machine for strapping open cases comprising a table operable to rise from a lower position to a higher level, an anvil for a case to rest upon yieldably supported by and above said table, means for guiding straps into positions underneath the opposite ends of a case on said anvil with their opposite end portions projecting beyond the side walls of the case, releasable case-arresting means for arresting upward movement of the case on said anvil during an initial phase in the upward movement of said table and thus cause relative approach of the rising table and the yieldable anvil, first strap bending mechanisms at the opposite ends of the anvil effective in response to relative approach of said anvil and said table to bend the oppositely projecting end portions of the straps underneath the case into contact with the side walls thereof so that their ends project a limited distance above the top edges of the case, means effective upon approach of said table and said anvil to cause release of said arresting means, and second strap bending mechanisms operative upon release of said arresting means and resumed upward movement of said anvil to bend the upwardly projecting ends of the straps into contact with the upper end edges of the case on said anvil.

5. A machine for strapping open cases comprising a table operable to rise from a lower position to a higher level, an anvil for a case to rest upon yieldably supported by and above said table, means for guiding straps into positions underneath the opposite ends of a case on said anvil with their opposite end portions projecting beyond the side walls of the case, releasable means for arresting upward movement of the case on said anvil during an initial phase in the upward movement of said table to cause relative approach of the rising table and the yieldable anvil, first strap bending mechanisms at the opposite ends of the anvil effective in response to relative approach of said anvil and said table to bend the oppositely projecting end portions of the straps underneath the case into contact with the side walls thereof so that their ends project a limited distance above the top edges of the case, means effective upon approach of said table and said anvil to cause release of said arresting means, second strap bending mechanisms operative upon release of said arresting means and resumed upward movement of said anvil to bend the upwardly projecting ends of the straps into contact with the upper end edges of the case on said anvil, and nailing mechanisms supported above the anvil and operative during further upward movement of said table to drive nails through the strap ends and into the end walls of the case on said anvil.

6. A machine for strapping open cases comprising an upwardly movable table, an anvil for a case to rest upon yieldably supported above said table, nailing mechanisms supported above the end walls of a case upon said anvil, centering means operable during an initial phase of the upward movement of said table to bring the end walls of the case on said anvil into vertical alignment with said nailing mechanisms, releasable case-arresting means disposed above said anvil to arrest upward movement of the case on said anvil during another phase in the upward movement of said table and thus cause relative approach of the rising table and the yieldable anvil, first strap bending mechanisms at the opposite ends of the anvil effective in response to relative approach of said anvil and said table to bend the oppositely projecting end portions of straps underneath the opposite ends of the case on said anvil into contact with the side walls of the case so that their ends project a limited distance above the top edges of the case, means effective upon closer approach of said table and said anvil to cause release of said arresting means, and second strap bending mechanisms operative upon release of said arresting means and resumed upward movement of said anvil to bend the upwardly projecting ends of the straps into contact with the upper end edges of the case on said anvil, said nailing mechanisms being operative during further upward movement of said table to drive nails through the strap ends and into the end walls of the case on said anvil.

7. A machine for strapping open cases comprising an upwardly movable table, an anvil for a case to rest upon yieldably supported above said table, nailing mechanisms supported above the end walls of a case upon said anvil, centering means operable during an initial phase of the upward movement of said table to bring the end walls of the case on said anvil into vertical alignment with said nailing mechanisms, releasable means for arresting upward movement of the case on said anvil during another phase in the upward movement of said table to cause relative approach of the rising table and the yieldable anvil, first strap bending mechanisms at the opposite ends of the anvil effective in response to relative approach of said anvil and said table to bend the oppositely projecting end portions of straps underneath the opposite ends of the case on said anvil into contact with the side walls of the case so that their ends project above the top edges of the case, means effective upon closer approach of said table and said anvil to cause release of said arresting means, second strap bending mechanisms operative upon release of said arresting means and resumed upward movement of said anvil to bend the upwardly projecting ends of the straps into contact with the upper end edges of the case on said anvil, and upwardly yielding funnelling means effective during operation of said second strap bending mechanisms to guide the strap ends accurately into contact with the upper end edges of the case on the rising anvil, said nailing mechanisms being operative during further upward movement of said table to drive nails through the strap ends and into the end walls of the case on said anvil.

8. A machine for strapping open cases comprising an upwardly movable table, an anvil for a case to rest upon yieldably supported by and above said table, nailing mechanisms supported above the end walls of a case upon said anvil, centering means operable during an initial phase in the upward movement of said table to bring the end walls of the case on said anvil into vertical alignment with said nailing mechanisms, releasable case-arresting means disposed above said anvil to arrest upward movement of the case on said anvil during another phase in the upward movement of said table and thus cause relative approach of the rising table and the yieldable anvil, first strap bending mechanisms at the opposite ends of the anvil effective in response to relative approach of said anvil and said table to bend the oppositely projecting end portions of straps underneath the opposite ends of the case on said anvil into contact with the side walls of the case so that their ends project a limited distance above the top edges of the case, means effective upon closer approach of said table and said anvil to cause release of said arresting means, second strap bending mechanisms on said first strap bending mechanisms operative upon release of said arresting means and resumed upward movement of said anvil to bend the upwardly projecting ends of the straps into contact with the upper end edges of the case on said anvil, and upwardly yielding funnelling means effective during operation of said second strap bending mechanisms to guide the strap ends accurately into contact with the upper end edges of the case on the rising anvil, said nailing mechanisms being operative during further upward movement of said table to drive nails through the strap ends and into the end walls of the case on said anvil.

9. A machine according to claim 8 comprising spring means arranged to hold said anvil and said table in their relatively approached position upon release of said arresting.

10. A machine for strapping open cases comprising an upwardly movable hydraulic table, an anvil for a case to rest upon yieldably supported by and above said hydraulic table, means for guiding straps into positions underneath the opposite ends of a case on said anvil with the opposite end portions of the straps projecting beyond the side walls of the case, nailing mechanisms supported above the end walls of a case upon said anvil, centering means operable during an initial phase in the upward movement of said hydraulic table to bring the end walls of the case on said anvil into vertical alignment with said nailing mechanisms, releasable case-arresting means spaced above said anvil to arrest upward movement of the case on said anvil during another phase in the upward movement of said hydraulic table and thus cause relative approach of the rising table and the yieldable anvil, first strap bending mechanisms at the opposite ends of the anvil effective in response to relative approach of said anvil and said hydraulic table to bend the oppositely projecting end portions of the straps into contact with the side walls of the case so that their ends project a limited distance above the top edges of the case, means effective upon closer approach of said hydraulic table and said anvil to cause release of said arresting means, second strap bending mechanisms on said first strap bending mechanisms operative upon release of said arresting means and resumed upward movement of said anvil to bend the upwardly projecting ends of the straps into contact with the upper end edges of the case on said anvil, and upwardly yielding funnelling means effective during operation of said second strap bending mechanisms to guide the strap ends accurately into contact with the upper end edges of the case on the rising anvil, said nailing mechanisms being operative during further upward movement of said hydraulic table to drive nails through the strap ends and into the end walls of the case on said anvil.

11. A machine according to claim 10 wherein the guide means on said anvil are arranged to be depressed below the case supporting surface of the anvil upon engagement of the case on the anvil with said case-arresting means.

12. A mechanism for bending a strap about a case comprising a table, an anvil disposed a distance above said table and adapted to support a case thereon with a side portion thereof projecting beyond one end of the anvil, a substantially vertical arm supported by said table adjacent said end of the anvil, a bending lever pivotally supported in a horizontal position by the upper end of said arm with its inner end extending below the projecting side portion of the case on said anvil, and means operable to effect relative approach of said table and said anvil to bring the projecting side portion of the case against the inner end of said lever and cause said lever to swing into vertical position thus bending the projecting end portion of a strap underneath the case on the anvil against the adjacent side wall of the case.

13. A mechanism for bending a strap about a case comprising a table, an anvil disposed a distance above said table and adapted to support a case thereon with its side portions projecting beyond the sides of the anvil, substantially vertical arms supported by said table adjacent the opposite ends of said anvil with their upper ends disposed at about the level of the case supporting anvil surface, bending levers pivotally supported in a horizontal position by the upper ends of said arms with their inner ends extending below the projecting side portions of the case on said anvil, and means operable to effect relative approach of said table and said anvil while holding the case upon said anvil to bring the projecting side portions of the case against the inner ends of said levers and cause said levers to swing into vertical positions thus bending the projecting end portions of straps underneath the case on the anvil against the side walls of the case.

14. A mechanism for bending a strap about a case comprising a table, an anvil disposed a distance above said table and adapted to support a case thereon with its side portions projecting beyond the sides of the anvil, arms pivotally supported by said table adjacent the opposite ends of said anvil, means yieldably urging said arms into substantially vertical positions wherein their upper ends are disposed adjacent the case supporting anvil surface, bending levers pivotally supported in a horizontal position by the upper ends of said arms with their inner ends extending below the projecting side portions of the case on said anvil, and means operable to effect relative approach of said table and said anvil while holding the case upon said anvil to bring the projecting side portions of the case against the inner ends of said levers and cause said levers to swing into vertical positions, thus bending the projecting end portions of a strap underneath the case on said anvil against the side walls of the case.

15. A mechanism for bending straps about a case comprising a table, an anvil disposed a distance above said table and adapted to support a case thereon with its side portions projecting beyond the ends of the anvil, means on said anvil for guiding straps underneath the opposite ends of a case situated thereon with their end portions projecting beyond the side walls of the case, arms pivotally supported by said table adjacent the opposite ends of said anvil, means yieldably urging said arms into substantially vertical positions wherein their upper ends are disposed adjacent the case supporting anvil surface, bending levers pivotally supported in a horizontal position by the upper ends of said arms with their inner ends extending below the projecting side portions of the case on said anvil adjacent the guide means thereof, guide means for the straps along the upper surfaces of said bending levers, and means operable to effect relative approach of said table and said anvil while holding the case upon said anvil to bring the projecting side portions of the case against the inner ends of said levers and cause said levers to swing into vertical positions, thus bending the projecting end portions of the straps against the side walls of the case on the anvil.

16. A machine according to claim 15 wherein the guide means on said anvil and said bending levers are arranged to yield below the upper surfaces of said anvil and said bending levers, respectively, during the bending operation.

17. A mechanism for bending a strap about a case comprising an anvil adapted to support a case thereon with a portion of the case projecting beyond the anvil, a first bending lever pivotally supported in a substantially horizontal position adjacent said anvil with an end of the bending lever extending from its pivotal support into a position below the case on said anvil, means operable to effect relative movement of the anvil and the pivotal support of the lever toward each other to engage said end of the lever with the bottom of the case on the anvil and upon continued relative movement of the anvil and support to swing said first bending lever into a vertical position to bend the projecting end portion of a strap underneath a case on said anvil against the adjacent side wall of the case with said end portion extending above said first bending lever, a second bending lever pivotally supported by the upper end of said first bending lever, and means effective upon said first bending lever having reached its vertical position to swing said second bending lever inwardly and press the upwardly projecting end of the strap against the upper surface of the case on said anvil.

18. A mechanism for bending a strap about a case comprising a table, an anvil disposed above said table and adapted to support a case with a side portion thereof projecting beyond the anvil, a first bending lever pivotally supported by said table in a substantially horizontal position with one of its ends extending below the projecting side portion of the case on said anvil, means for effecting relative approach of said table and said anvil while holding the case onto said anvil to bring the projecting side portion of the case against the adjacent end of said first bending lever causing it to swing into a vertical position to bend the projecting end portion of a strap slid underneath the case on said anvil against the adjacent side wall of the case with said end portion extending above said first bending lever, a second bending lever pivotally supported by the other end of said first bending lever, and camming means effective upon said first bending lever having reached its vertical position to swing said second bending lever inwardly and press the upwardly projecting end of the strap against the upper surface of the case on said anvil.

19. Mechanism according to claim 18 wherein said second bending lever forms a surface adapted to overlie the upper surface of the case on the anvil and a surface adapted to bear against the adjacent side wall of the case.

20. A mechanism for bending a strap about a case comprising a table, an anvil disposed above said table and adapted to support a case with its side portions projecting beyond the ends of the anvil, arms pivotally supported by said table at either end and below the case supporting surface of said anvil, spring means yieldably urging said arms into substantially vertical positions, first bending levers pivotally supported by the upper ends of said arms in substantially horizontal positions with their inner ends extending below the projecting side portions of the case on the anvil, means for effecting relative approach of said table and said anvil while holding the case onto said anvil to bring the projecting side portions of the case against the inner ends of said first bending levers and cause them to swing into substantially vertical positions wherein they bend the projecting end portions of a strap underneath the case on said anvil with its end portions extending beyond said first bending levers against the side walls of the case, second bending levers pivotally supported by the outer ends of said first bending levers, and means effective upon said first bending levers having reached their vertical positions to swing said second bending levers inwardly and press the upwardly projecting ends of the strap against the upper surface of the case.

21. A mechanism for bending a strap about the end of an open case comprising a table, an anvil disposed above said table and adapted to support a case with its side portions projecting beyond the ends of the anvil, arms pivotally supported by said table at either end and below the case supporting surface of said anvil, spring means yieldably urging said arms into substantially vertical positions, first bending levers pivotally supported in substantially horizontal positions by the upper ends of said arms with their inner ends extending below the projecting side portions of the case on the anvil adjacent one end of the case, means for effecting relative approach of said table and said anvil while holding the case onto said anvil to bring the projecting side portions of the case against the inner ends of said first bending levers and cause them to swing into substantially vertical positions wherein they bend the projecting end portions of a strap underneath the case on said anvil with its end portions extending beyond said first bending levers against the side walls of the case, second bending levers pivotally supported by the outer ends of said first bending levers, means effective upon said first bending levers having reached their vertical positions to swing said second bending levers inwardly and press the upwardly projecting ends of the strap against the upper edge of the adjacent end wall of the case, and funnelling means adapted during operation of said second bending levers to engage the mentioned end wall of the case and effective to guide the strap ends accurately into contact with the upper edge of the adjacent end wall of the case.

22. A machine for bending a strap about a case comprising a stationary base structure and superstructure supported above said base structure, a table operable to rise from a lower position within said base structure to an elevated position adjacent said superstructure, an anvil yieldably supported by and above said table and adapted to support a case with its side portions projecting beyond the ends of said anvil, first bending levers pivotally supported by said table adjacent the ends of said anvil with their inner ends extending in a horizontal position below the projecting side portions of a case on said anvil, a slide mounted adjacent said table, means releasably latching said slide to said base structure, arresting means supported by said slide and extending into the space above a case on said anvil, means operable to raise said table to bring the case on said yieldable anvil against said arresting means and thus cause said anvil and said table to approach each other and the projecting side portions of the case to bear against the inner ends of said first bending levers and swing them into vertical position adjacent the side walls of the case thus bending the projecting end portions of a strap underneath the case on the anvil against the side walls of the case, means effective upon said yieldable anvil and said table approaching each other during upward movement of said table to effect release of said latching means and cause said slide and the arresting means supported thereby to rise in unison with said table, second bending levers pivoted to the upper ends of said first bending levers, and camming means supported by said superstructure and adapted upon further upward movement of said table to engage said second bending levers and swing them inwardly toward the upper surface of the case on said anvil to bend the upwardly projecting strap ends into contact with the upper surface of the case.

23. A machine for bending straps about an open case comprising a stationary base structure and a superstructure supported above said base structure, a table operable to rise from a lower position within said base structure to an elevated position adjacent said superstructure, an anvil yieldably supported by and above said table and adapted to support a case with its side portions projecting beyond the ends of said anvil, arms supported by said table below and at either end of said yieldable anvil, first bending levers pivoted in horizontal position to the upper ends of said arms with their inner ends extending below the projecting side portions of the case on said yieldable anvil to points in close proximity to the ends of the anvil, a slide mounted adjacent said table, means releasably latching said slide to said base structure, arresting means supported by said slide and extending into the space above a case on said yieldable anvil, means operable to raise said table to bring the case on said yieldable anvil against said arresting means and thus cause said yieldable anvil and said table to approach ech other and the projecting side portions of the case to bear against the inner ends of said first bending levers and swing them into vertical positions adjacent the side walls of the case thus bending the projecting end portions of straps underneath the opposite ends of the case on the anvil against the side walls of the case, means effective upon said yieldable anvil and said table approaching each other during upward movement of said table to effect release of said latching means and cause said slide and the arresting means supported thereby to rise in unison with said table, second bending levers pivoted to the upper ends of said first bending levers, and camming means supported by said superstructure and adapted upon further upward movement of said table to engage said second bending levers and swing them inwardly toward the upper surface of the case on said anvil to bend the upwardly projecting end portions of the straps into contact with the upper edges of the end walls of the case.

24. A machine for bending straps about an open case comprising a stationary base structure and a superstructure supported above said base structure, a table operable to rise from a lower position within said base structure to an elevated position adjacent said superstructure, an anvil yieldably supported by and above said table and adapted to support a case with its side portions projecting beyond the ends of said anvil, arms supported by said table below and at either end of said yieldable anvil, first bending levers pivoted in horizontal position to the upper ends of said arms with their inner ends extending below the projecting side portions of the case on said yieldable anvil to points in close proximity to the ends of the anvil, a slide mounted adjacent said table, means releasably latching said slide to said base structure, arresting means supported by said slide and extending into the space above a case on said yieldable anvil, means operable to raise said table to bring the case on said yieldable anvil against said arresting means and thus cause said yieldable anvil and said table to approach each other and the projecting side portions of the case to bear against the inner ends of said first bending levers and swing them into vertical positions adjacent the side walls of the case thus bending the projecting end portions of straps underneath the opposite ends of the case on the anvil against the side walls of the case, means effective upon said yieldable anvil and said table approaching each other during upward movement of said table to effect release of said latching means and cause said slide and the arresting means supported thereby to rise in unison with said table, second bending levers pivoted to the upper ends of said first bending levers, camming means supported by said superstructure and adapted upon continued upward movement of said table to engage said second bending levers and swing them inwardly toward the upper surface of the case on said anvil to bend the upwardly projecting end portions of the straps into contact with the upper edges of the end walls of the case, and nailing mechanisms supported by said superstructure and effective upon further upward movement of said table to drive nails through the inwardly bent strap ends and into the end walls of the case.

25. Machine according to claim 24 wherein said second bending levers form beaks presenting to the case upon the anvil surfaces adapted to overlie the upper end edges thereof, and at right angles thereto adjoining surfaces adapted to bear against the side walls of the case.

26. A centering mechanism for cases on hydraulic tables comprising L-shaped lever arms pivotally supported by and above the hydraulic table at either side thereof with their horizontal bars extending laterally away from the walls of a case on the hydraulic table, a stationary plate disposed a distance above the hydraulic table, links pivoted to the horizontal bars of said lever arms and extending upwardly to protrude loosely through apertures provided in said plate, retaining means upon the upper ends of said links above said plate to hold the L-shaped lever arms in a position wherein their corner edges are withdrawn from the adjacent walls of a case on the hydraulic table as long as said table is in a lowered position, and spring means urging said lever arms into a position wherein their corner edges move against and engage the adjacent walls of the case on said table when the retaining means at the upper ends of said links are shifted into ineffective position above said plate by elevation of the hydraulic table.

27. A centering mechanism for cases on hydraulic tables comprising vertically disposed mounting plates at either side of the table, L-shaped lever arms pivotally supported at the upper ends of their vertical bars on said mounting plates with their horizontal bars extending laterally away from said mounting plates a stationary overhead plate disposed a distance above the hydraulic table, upwardly extending links pivoted to the horizontal bars of said lever arms and protruding loosely through apertures provided in said overhead plate, retaining means upon the ends of said links above said overhead plate to hold said lever arms in a position wherein their corner edges are withdrawn from the adjacent walls of a case on the hydraulic table as long as said table is in a lowered position, and spring means engaging the horizontal bars of said lever arms and urging said lever arms into a position wherein their corner edges move through recesses in said mounting plates toward and contact the adjacent walls of the case on said table when the retaining means at the upper ends of said links are shifted into ineffective position above said overhead plate by elevation of the hydraulic table.

28. A mechanism for centering an article on an upwardly moving table comprising opposed L-shaped arms carried by said table adjacent either end thereof and including vertical bars pivotally connected to the table adjacent the upper ends of the vertical bars and horizontal bars projecting laterally away from the article on the table, and means engaging said horizontal bars and operative in response to upward movement of the table for swinging the L-shaped arms inward to move the article relatively to the table by pressure of the corner edges of the arms against the article.

29. Mechanism for disposing and retaining an article in a specific position on a movable table, comprising an L-shaped arm carried by said table and including a vertical bar pivotally connected to the table adjacent the upper end of the vertical bar and a horizontal bar projecting laterally away from the article on the table, and means engaging said horizontal bar and operative in response to movement of the table for swinging the L-shaped arm inwardly to move the article relatively to the table by pressure of the corner of the arm against the article.

30. Mechanism for adjusting the position of an article on a vertically movable elevator table, comprising an arm connected to the table for movement laterally toward and away from the table, spring means urging said arm toward said article with sufficient force to move the article with relation to the table, and means operative while the table is in a fixed position for holding said arm in a position withdrawn from the article.

References Cited in the file of this patent

UNITED STATES PATENTS

| | | |
|---|---|---|
| 1,323,143 | Abbott | Nov. 25, 1919 |
| 2,232,725 | Paxton | Feb. 25, 1941 |
| 2,546,281 | Talbot | Mar. 27, 1951 |
| 2,644,944 | Kott | July 14, 1953 |
| 2,676,691 | Temple | Apr. 27, 1954 |